(12) United States Patent
Banin et al.

(10) Patent No.: US 12,265,150 B2
(45) Date of Patent: Apr. 1, 2025

(54) APPARATUS, SYSTEM AND METHOD OF RADAR TRACKING

(71) Applicant: Intel Corporation, Santa Clara, CA (US)

(72) Inventors: Leor Banin, Petach Tikva (IL); Yuval Amizur, Kfar-Saba (IL); Nir Dvorecki, Herzeliya (IL)

(73) Assignee: INTEL CORPORATION, Santa Clara, CA (US)

( * ) Notice: Subject to any disclaimer, the term of this patent is extended or adjusted under 35 U.S.C. 154(b) by 71 days.

(21) Appl. No.: 17/584,105

(22) Filed: Jan. 25, 2022

(65) Prior Publication Data

US 2022/0146667 A1 May 12, 2022

(51) Int. Cl.
| | |
|---|---|
| *G01S 13/931* | (2020.01) |
| *G01S 13/08* | (2006.01) |
| *G01S 13/58* | (2006.01) |
| *G01S 13/66* | (2006.01) |

(52) U.S. Cl.
CPC ............ *G01S 13/931* (2013.01); *G01S 13/08* (2013.01); *G01S 13/58* (2013.01); *G01S 13/66* (2013.01)

(58) Field of Classification Search
CPC ...... G01S 13/931; G01S 13/726; G01S 13/58; G01S 13/66; G01S 13/60; G01S 7/415
USPC .................................................... 342/70, 90
See application file for complete search history.

(56) References Cited

U.S. PATENT DOCUMENTS

| | | | | |
|---|---|---|---|---|
| 5,392,050 A | * | 2/1995 | Guerci | G01S 7/412 342/90 |
| 5,949,367 A | * | 9/1999 | Trompf | G01S 7/417 700/48 |
| 6,278,401 B1 | * | 8/2001 | Wigren | G01S 3/325 342/115 |

(Continued)

FOREIGN PATENT DOCUMENTS

| | | | |
|---|---|---|---|
| CN | 114137526 A | * | 3/2022 |
| EP | 3572970 | | 11/2019 |

(Continued)

OTHER PUBLICATIONS

Ba-Ngu Vo et al., "The Gaussian Mixture Probability Hypothesis Density Filter", IEEE Transactions on Signal Processing, vol. 54, No. 11, Nov. 2006, pp. 4091-4104.

(Continued)

*Primary Examiner* — Vladimir Magloire
*Assistant Examiner* — Michael W Justice
(74) *Attorney, Agent, or Firm* — Shichrur & Co.

(57) ABSTRACT

Some aspects relate to an apparatus, method and/or system of radar tracking. For example, a radar tracker may be configured to generate target tracking information corresponding to a plurality of targets in an environment of a radar device. For example, the radar tracker may include a processor configured to determine the target tracking information based on a plurality of multi-target density functions corresponding to a respective plurality of target types, and to update the plurality of multi-target density functions based on detection information corresponding to a plurality of detections in the environment. For example, the radar tracker may include an output to output the target tracking information.

23 Claims, 14 Drawing Sheets

(56) References Cited

U.S. PATENT DOCUMENTS

| | | | | |
|---|---|---|---|---|
| 6,363,160 B1* | 3/2002 | Bradski | | G06F 3/017 |
| | | | | 382/103 |
| 6,546,378 B1* | 4/2003 | Cook | | A61B 5/372 |
| | | | | 706/20 |
| 6,692,439 B1* | 2/2004 | Walker | | G01S 15/8927 |
| | | | | 600/443 |
| 6,745,156 B2* | 6/2004 | Cook | | A61B 5/316 |
| | | | | 702/11 |
| 6,988,056 B2* | 1/2006 | Cook | | A61B 5/369 |
| | | | | 702/183 |
| 7,180,442 B1* | 2/2007 | Nguyen | | G01S 7/539 |
| | | | | 324/76.12 |
| 7,991,550 B2* | 8/2011 | Zeng | | G01S 13/931 |
| | | | | 701/300 |
| 8,041,115 B2* | 10/2011 | Liu | | G06F 18/2411 |
| | | | | 382/199 |
| 8,463,579 B2* | 6/2013 | Vierinen | | G01S 13/66 |
| | | | | 702/181 |
| 8,954,272 B2* | 2/2015 | Adam | | G01S 13/726 |
| | | | | 701/519 |
| 9,002,642 B2* | 4/2015 | Noble | | G01S 7/415 |
| | | | | 701/519 |
| 9,373,051 B2* | 6/2016 | Viviani | | G06T 7/277 |
| 9,453,911 B2* | 9/2016 | Shiba | | G01S 13/726 |
| 9,739,881 B1* | 8/2017 | Pavek | | G01S 13/865 |
| 9,851,437 B2* | 12/2017 | Bageshwar | | G01S 13/66 |
| 9,864,051 B2* | 1/2018 | Nielsen | | G01S 7/292 |
| 10,309,784 B2* | 6/2019 | Bageshwar | | G01S 13/86 |
| 10,451,720 B2* | 10/2019 | Liu | | G01S 13/931 |
| 10,605,607 B2* | 3/2020 | Bageshwar | | G01B 21/16 |
| 10,782,396 B2* | 9/2020 | Turner | | G01S 13/726 |
| 11,175,142 B2* | 11/2021 | Bageshwar | | G01S 13/726 |
| 11,269,058 B2* | 3/2022 | Harrison | | G01S 7/415 |
| 11,308,338 B2* | 4/2022 | Yang | | G01S 7/4052 |
| 11,340,333 B1* | 5/2022 | Harris | | G06N 7/01 |
| 11,391,833 B2* | 7/2022 | Marsch | | G06V 20/56 |
| 11,635,764 B2* | 4/2023 | Djuric | | G01S 17/931 |
| | | | | 701/25 |
| 11,841,421 B2* | 12/2023 | Tanaka | | G01S 13/9056 |
| 2003/0149678 A1* | 8/2003 | Cook | | G01V 1/282 |
| | | | | 706/46 |
| 2004/0220782 A1* | 11/2004 | Cook | | A61B 5/372 |
| | | | | 702/189 |
| 2008/0118161 A1* | 5/2008 | Liu | | G06F 18/2411 |
| | | | | 382/228 |
| 2008/0300787 A1* | 12/2008 | Zeng | | G01S 13/931 |
| | | | | 701/301 |
| 2009/0306894 A1* | 12/2009 | Noble | | G06Q 10/08355 |
| | | | | 705/338 |
| 2012/0183035 A1* | 7/2012 | Vierinen | | G01S 13/66 |
| | | | | 375/227 |
| 2012/0223853 A1* | 9/2012 | Shiba | | G01S 13/726 |
| | | | | 367/87 |
| 2013/0150073 A1* | 6/2013 | Jovicic | | G01S 5/021 |
| | | | | 455/456.1 |
| 2014/0195195 A1* | 7/2014 | Fishel | | A61B 5/01 |
| | | | | 702/181 |
| 2014/0324339 A1* | 10/2014 | Adam | | G01S 13/726 |
| | | | | 701/519 |
| 2015/0301170 A1* | 10/2015 | Nielsen | | G01S 13/72 |
| | | | | 342/160 |
| 2016/0033276 A1* | 2/2016 | Bageshwar | | G01S 13/867 |
| | | | | 702/150 |
| 2016/0033281 A1* | 2/2016 | Bageshwar | | G01D 9/32 |
| | | | | 702/153 |
| 2016/0033282 A1* | 2/2016 | Bageshwar | | G01S 13/865 |
| | | | | 702/150 |
| 2016/0033633 A1* | 2/2016 | Bageshwar | | G01S 13/867 |
| | | | | 342/29 |
| 2016/0098612 A1* | 4/2016 | Viviani | | G06T 1/20 |
| | | | | 382/103 |
| 2017/0205501 A1* | 7/2017 | Liu | | G01S 7/414 |
| 2017/0315229 A1* | 11/2017 | Pavek | | G01S 13/931 |
| 2019/0383904 A1* | 12/2019 | Harrison | | G01S 13/931 |
| 2020/0191941 A1* | 6/2020 | Marsch | | G01S 13/588 |
| 2020/0210726 A1* | 7/2020 | Yang | | G06V 10/70 |
| 2020/0272160 A1* | 8/2020 | Djuric | | G06T 7/20 |
| 2021/0132214 A1* | 5/2021 | Tanaka | | G01S 13/9027 |
| 2021/0141092 A1 | 5/2021 | Chen et al. | | |
| 2021/0354690 A1* | 11/2021 | Yershov | | G05D 1/0274 |
| 2023/0126991 A1* | 4/2023 | Maor | | G01S 13/343 |
| | | | | 342/174 |

FOREIGN PATENT DOCUMENTS

| | | |
|---|---|---|
| KR | 10-2017-0134092 | 12/2017 |
| KR | 10-2328065 | 11/2021 |

OTHER PUBLICATIONS

International Search Report and the Written Opinion for International Application No. PCT/US2022/054014, mailed on May 4, 2023, 11 pages.

* cited by examiner

APPARATUS, SYSTEM AND METHOD OF RADAR TRACKING

TECHNICAL FIELD

Aspects described herein generally relate to radar tracking.

BACKGROUND

Various types of devices and systems, for example, autonomous and/or robotic devices, e.g., autonomous vehicles and robots, may be configured to perceive and navigate through their environment using sensor data of one or more sensor types.

Conventionally, autonomous perception relies heavily on light-based sensors, such as image sensors, e.g., cameras, and/or Light Detection and Ranging (LIDAR) sensors. Such light-based sensors may perform poorly under certain conditions, such as, conditions of poor visibility, or in certain inclement weather conditions, e.g., rain, snow, hail, or other forms of precipitation, thereby limiting their usefulness or reliability.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
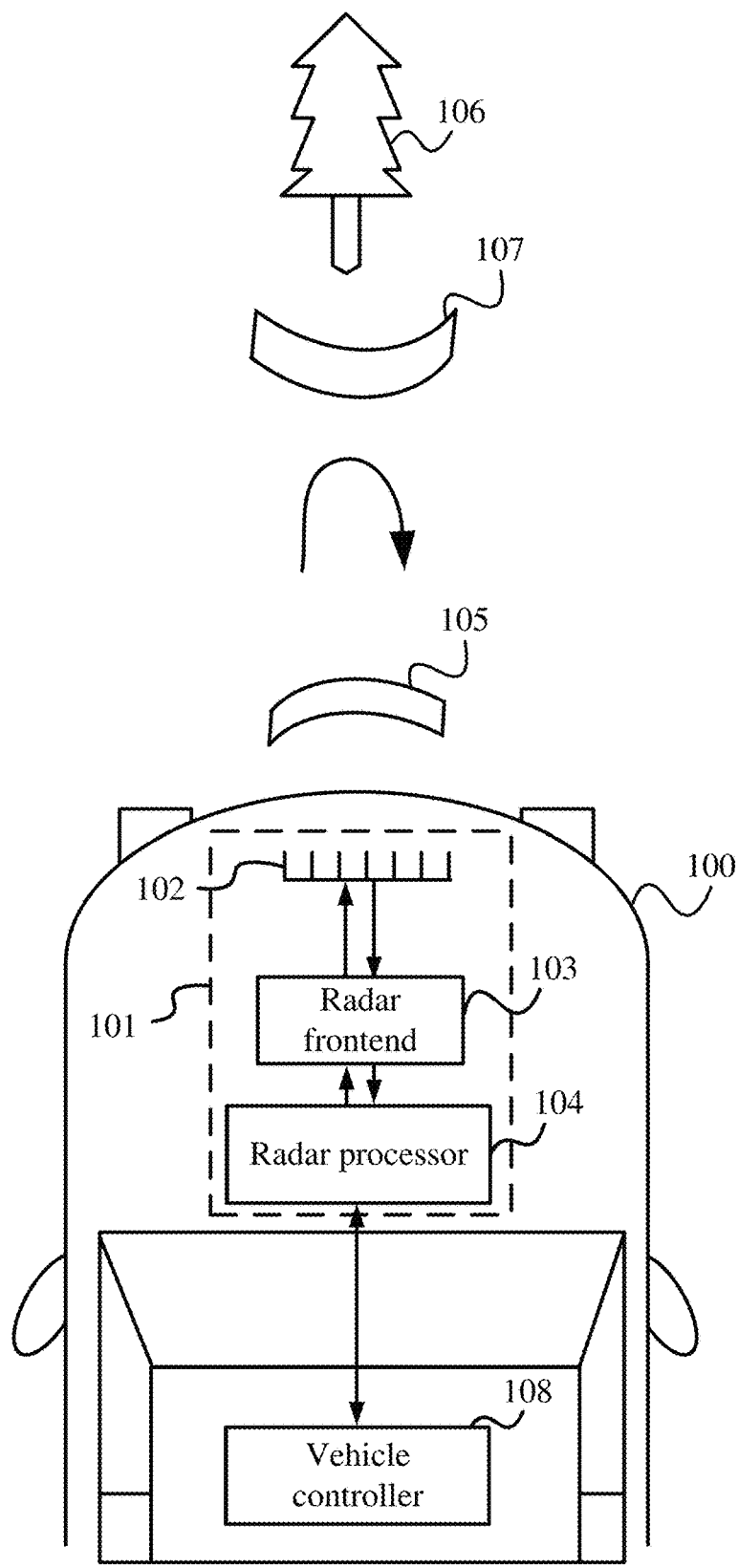
FIG. 1 is a schematic block diagram illustration of a vehicle implementing a radar, in accordance with some demonstrative aspects.

In the following detailed description, numerous specific details are set forth in order to provide a thorough understanding of some aspects. However, it will be understood by persons of ordinary skill in the art that some aspects may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

The words "exemplary" and "demonstrative" are used herein to mean "serving as an example, instance, demonstration, or illustration". Any aspect, aspect, or design described herein as "exemplary" or "demonstrative" is not necessarily to be construed as preferred or advantageous over other aspects, aspects, or designs.

References to "one aspect", "an aspect", "demonstrative aspect", "various aspects" "one aspect", "an aspect", "demonstrative aspect", "various aspects" etc., indicate that the aspect(s) and/or aspects so described may include a particular feature, structure, or characteristic, but not every aspect or aspect necessarily includes the particular feature, structure, or characteristic. Further, repeated use of the phrase "in one aspect" or "in one aspect" does not necessarily refer to the same aspect or aspect, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

The phrases "at least one" and "one or more" may be understood to include a numerical quantity greater than or equal to one, e.g., one, two, three, four, [ . . . ], etc. The phrase "at least one of" with regard to a group of elements may be used herein to mean at least one element from the group consisting of the elements. For example, the phrase "at least one of" with regard to a group of elements may be used herein to mean one of the listed elements, a plurality of one of the listed elements, a plurality of individual listed elements, or a plurality of a multiple of individual listed elements.

The term "data" as used herein may be understood to include information in any suitable analog or digital form, e.g., provided as a file, a portion of a file, a set of files, a signal or stream, a portion of a signal or stream, a set of signals or streams, and the like. Further, the term "data" may also be used to mean a reference to information, e.g., in form of a pointer. The term "data", however, is not limited to the aforementioned examples and may take various forms and/or may represent any information as understood in the art.

The terms "processor" or "controller" may be understood to include any kind of technological entity that allows handling of any suitable type of data and/or information. The data and/or information may be handled according to one or more specific functions executed by the processor or controller. Further, a processor or a controller may be understood as any kind of circuit, e.g., any kind of analog or digital circuit. A processor or a controller may thus be or include an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), and the like, or any combination thereof. Any other kind of implementation of the respective functions, which will be described below in further detail, may also be understood as a processor, controller, or logic circuit. It is understood that any two (or more) processors, controllers, or logic circuits detailed herein may be realized as a single entity with equivalent functionality or the like, and conversely that any single processor, controller, or logic circuit detailed herein may be realized as two (or more) separate entities with equivalent functionality or the like.

The term "memory" is understood as a computer-readable medium (e.g., a non-transitory computer-readable medium) in which data or information can be stored for retrieval. References to "memory" may thus be understood as referring to volatile or non-volatile memory, including random access memory (RAM), read-only memory (ROM), flash memory, solid-state storage, magnetic tape, hard disk drive, optical drive, among others, or any combination thereof. Registers, shift registers, processor registers, data buffers, among others, are also embraced herein by the term memory. The term "software" may be used to refer to any type of executable instruction and/or logic, including firmware.

A "vehicle" may be understood to include any type of driven object. By way of example, a vehicle may be a driven object with a combustion engine, an electric engine, a reaction engine, an electrically driven object, a hybrid driven object, or a combination thereof. A vehicle may be, or may include, an automobile, a bus, a mini bus, a van, a truck, a mobile home, a vehicle trailer, a motorcycle, a bicycle, a tricycle, a train locomotive, a train wagon, a moving robot, a personal transporter, a boat, a ship, a submersible, a submarine, a drone, an aircraft, a rocket, among others.

A "ground vehicle" may be understood to include any type of vehicle, which is configured to traverse the ground, e.g., on a street, on a road, on a track, on one or more rails, off-road, or the like.

An "autonomous vehicle" may describe a vehicle capable of implementing at least one navigational change without driver input. A navigational change may describe or include a change in one or more of steering, braking, acceleration/deceleration, or any other operation relating to movement, of the vehicle. A vehicle may be described as autonomous even in case the vehicle is not fully autonomous, for example, fully operational with driver or without driver input. Autonomous vehicles may include those vehicles that can operate under driver control during certain time periods, and without driver control during other time periods. Additionally or alternatively, autonomous vehicles may include vehicles that control only some aspects of vehicle navigation, such as steering, e.g., to maintain a vehicle course between vehicle lane constraints, or some steering operations under certain circumstances, e.g., not under all circumstances, but may leave other aspects of vehicle navigation to the driver, e.g., braking or braking under certain circumstances. Additionally or alternatively, autonomous vehicles may include vehicles that share the control of one or more aspects of vehicle navigation under certain circumstances, e.g., hands-on, such as responsive to a driver input; and/or vehicles that control one or more aspects of vehicle navigation under certain circumstances, e.g., hands-off, such as independent of driver input. Additionally or alternatively, autonomous vehicles may include vehicles that control one or more aspects of vehicle navigation under certain circumstances, such as under certain environmental conditions, e.g., spatial areas, roadway conditions, or the like. In some aspects, autonomous vehicles may handle some or all aspects of braking, speed control, velocity control, steering, and/or any other additional operations, of the vehicle. An autonomous vehicle may include those vehicles that can operate without a driver. The level of autonomy of a vehicle may be described or determined by the Society of Automotive Engineers (SAE) level of the vehicle, e.g., as defined by the SAE, for example in SAE J3016 2018: Taxonomy and definitions for terms related to driving automation systems for on road motor vehicles, or by other relevant professional organizations. The SAE level may have a value ranging from a minimum level, e.g., level 0 (illustratively, substantially no driving automation), to a maximum level, e.g., level 5 (illustratively, full driving automation).

An "assisted vehicle" may describe a vehicle capable of informing a driver or occupant of the vehicle of sensed data or information derived therefrom.

The phrase "vehicle operation data" may be understood to describe any type of feature related to the operation of a vehicle. By way of example, "vehicle operation data" may describe the status of the vehicle, such as, the type of tires of the vehicle, the type of vehicle, and/or the age of the manufacturing of the vehicle. More generally, "vehicle operation data" may describe or include static features or static vehicle operation data (illustratively, features or data not changing over time). As another example, additionally or alternatively, "vehicle operation data" may describe or include features changing during the operation of the vehicle, for example, environmental conditions, such as weather conditions or road conditions during the operation of the vehicle, fuel levels, fluid levels, operational parameters of the driving source of the vehicle, or the like. More generally, "vehicle operation data" may describe or include varying features or varying vehicle operation data (illustratively, time varying features or data).

Some aspects may be used in conjunction with various devices and systems, for example, a radar sensor, a radar device, a radar system, a vehicle, a vehicular system, an autonomous vehicular system, a vehicular communication system, a vehicular device, an airborne platform, a waterborne platform, road infrastructure, sports-capture infrastructure, city monitoring infrastructure, static infrastructure platforms, indoor platforms, moving platforms, robot platforms, industrial platforms, a sensor device, a User Equipment (UE), a Mobile Device (MD), a wireless station (STA), a sensor device, a non-vehicular device, a mobile or portable device, and the like.

Some aspects may be used in conjunction with Radio Frequency (RF) systems, radar systems, vehicular radar systems, autonomous systems, robotic systems, detection systems, or the like.

Some demonstrative aspects may be used in conjunction with an RF frequency in a frequency band having a starting frequency above 10 Gigahertz (GHz), for example, a frequency band having a starting frequency between 10 GHz and 120 GHz. For example, some demonstrative aspects may be used in conjunction with an RF frequency having a starting frequency above 30 GHz, for example, above 45 GHz, e.g., above 60 GHz. For example, some demonstrative aspects may be used in conjunction with an automotive radar frequency band, e.g., a frequency band between 76 GHz and 81 GHz. However, other aspects may be implemented utilizing any other suitable frequency bands, for example, a frequency band above 140 GHz, a frequency band of 300 GHz, a sub Terahertz (THz) band, a THz band, an Infra-Red (IR) band, and/or any other frequency band.

As used herein, the term "circuitry" may refer to, be part of, or include, an Application Specific Integrated Circuit (ASIC), an integrated circuit, an electronic circuit, a processor (shared, dedicated, or group), and/or memory (shared, dedicated, or group), that execute one or more software or firmware programs, a combinational logic circuit, and/or other suitable hardware components that provide the described functionality. In some aspects, the circuitry may be implemented in, or functions associated with the circuitry may be implemented by, one or more software or firmware modules. In some aspects, circuitry may include logic, at least partially operable in hardware.

The term "logic" may refer, for example, to computing logic embedded in circuitry of a computing apparatus and/or computing logic stored in a memory of a computing apparatus. For example, the logic may be accessible by a processor of the computing apparatus to execute the computing logic to perform computing functions and/or operations. In one example, logic may be embedded in various types of memory and/or firmware, e.g., silicon blocks of various chips and/or processors. Logic may be included in, and/or implemented as part of, various circuitry, e.g., radio circuitry, receiver circuitry, control circuitry, transmitter circuitry, transceiver circuitry, processor circuitry, and/or the like. In one example, logic may be embedded in volatile memory and/or non-volatile memory, including random access memory, read only memory, programmable memory, magnetic memory, flash memory, persistent memory, and/or the like. Logic may be executed by one or more processors using memory, e.g., registers, buffers, stacks, and the like, coupled to the one or more processors, e.g., as necessary to execute the logic.

The term "communicating" as used herein with respect to a signal includes transmitting the signal and/or receiving the signal. For example, an apparatus, which is capable of communicating a signal, may include a transmitter to transmit the signal, and/or a receiver to receive the signal. The verb communicating may be used to refer to the action of transmitting or the action of receiving. In one example, the phrase "communicating a signal" may refer to the action of transmitting the signal by a transmitter, and may not necessarily include the action of receiving the signal by a receiver. In another example, the phrase "communicating a signal" may refer to the action of receiving the signal by a receiver, and may not necessarily include the action of transmitting the signal by a transmitter.

The term "antenna", as used herein, may include any suitable configuration, structure and/or arrangement of one or more antenna elements, components, units, assemblies and/or arrays. In some aspects, the antenna may implement transmit and receive functionalities using separate transmit and receive antenna elements. In some aspects, the antenna may implement transmit and receive functionalities using common and/or integrated transmit/receive elements. The antenna may include, for example, a phased array antenna, a MIMO (Multiple-Input Multiple-Output) array antenna, a single element antenna, a set of switched beam antennas, and/or the like. In one example, an antenna may be implemented as a separate element or an integrated element, for example, as an on-module antenna, an on-chip antenna, or according to any other antenna architecture.

Some demonstrative aspects are described herein with respect to RF radar signals. However, other aspects may be implemented with respect to, or in conjunction with, any other radar signals, wireless signals, IR signals, acoustic signals, optical signals, wireless communication signals, communication scheme, network, standard, and/or protocol. For example, some demonstrative aspects may be implemented with respect to systems, e.g., Light Detection Ranging (LiDAR) systems, and/or sonar systems, utilizing light and/or acoustic signals.

Reference is now made to FIG. 1, which schematically illustrates a block diagram of a vehicle 100 implementing a radar, in accordance with some demonstrative aspects.

In some demonstrative aspects, vehicle 100 may include a car, a truck, a motorcycle, a bus, a train, an airborne vehicle, a waterborne vehicle, a cart, a golf cart, an electric cart, a road agent, or any other vehicle.

In some demonstrative aspects, vehicle 100 may include a radar device 101, e.g., as described below. For example, radar device 101 may include a radar detecting device, a radar sensing device, a radar sensor, or the like, e.g., as described below.

In some demonstrative aspects, radar device 101 may be implemented as part of a vehicular system, for example, a system to be implemented and/or mounted in vehicle 100.

In one example, radar device 101 may be implemented as part of an autonomous vehicle system, an automated driving system, an assisted vehicle system, a driver assistance and/or support system, and/or the like.

For example, radar device 101 may be installed in vehicle 100 for detection of nearby objects, e.g., for autonomous driving.

In some demonstrative aspects, radar device 101 may be configured to detect targets in a vicinity of vehicle 100, e.g., in a far vicinity and/or a near vicinity, for example, using RF and analog chains, capacitor structures, large spiral transformers and/or any other electronic or electrical elements, e.g., as described below.

In one example, radar device 101 may be mounted onto, placed, e.g., directly, onto, or attached to, vehicle 100.

In some demonstrative aspects, vehicle 100 may include a plurality of radar aspects, vehicle 100 may include a single radar device 101.

In some demonstrative aspects, vehicle 100 may include a plurality of radar devices 101, which may be configured to cover a field of view of 360 degrees around vehicle 100.

In other aspects, vehicle 100 may include any other suitable count, arrangement, and/or configuration of radar devices and/or units, which may be suitable to cover any other field of view, e.g., a field of view of less than 360 degrees.

In some demonstrative aspects, radar device 101 may be implemented as a component in a suite of sensors used for driver assistance and/or autonomous vehicles, for example, due to the ability of radar to operate in nearly all-weather conditions.

In some demonstrative aspects, radar device 101 may be configured to support autonomous vehicle usage, e.g., as described below.

In one example, radar device 101 may determine a class, a location, an orientation, a velocity, an intention, a perceptional understanding of the environment, and/or any other information corresponding to an object in the environment.

In another example, radar device 101 may be configured to determine one or more parameters and/or information for one or more operations and/or tasks, e.g., path planning, and/or any other tasks.

In some demonstrative aspects, radar device 101 may be configured to map a scene by measuring targets' echoes (reflectivity) and discriminating them, for example, mainly in range, velocity, azimuth and/or elevation, e.g., as described below.

In some demonstrative aspects, radar device 101 may be configured to detect, and/or sense, one or more objects, which are located in a vicinity, e.g., a far vicinity and/or a near vicinity, of the vehicle 100, and to provide one or more parameters, attributes, and/or information with respect to the objects.

In some demonstrative aspects, the objects may include other vehicles; pedestrians; traffic signs; traffic lights; roads, road elements, e.g., a pavement-road meeting, an edge line; a hazard, e.g., a tire, a box, a crack in the road surface; and/or the like.

In some demonstrative aspects, the one or more parameters, attributes and/or information with respect to the object may include a range of the objects from the vehicle 100, an angle of the object with respect to the vehicle 100, a location of the object with respect to the vehicle 100, a relative speed of the object with respect to vehicle 100, and/or the like.

In some demonstrative aspects, radar device 101 may include a Multiple Input Multiple Output (MIMO) radar device 101, e.g., as described below. In one example, the MIMO radar device may be configured to utilize "spatial filtering" processing, for example, beamforming and/or any other mechanism, for one or both of Transmit (Tx) signals and/or Receive (Rx) signals.

Some demonstrative aspects are described below with respect to a radar device, e.g., radar device 101, implemented as a MIMO radar. However, in other aspects, radar device 101 may be implemented as any other type of radar utilizing a plurality of antenna elements, e.g., a Single Input Multiple Output (SIMO) radar or a Multiple Input Single output (MISO) radar.

Some demonstrative aspects may be implemented with respect to a radar device, e.g., radar device 101, implemented as a MIMO radar, e.g., as described below. However, in other aspects, radar device 101 may be implemented as any other type of radar, for example, an Electronic Beam Steering radar, a Synthetic Aperture Radar (SAR), adaptive and/or cognitive radars that change their transmission according to the environment and/or ego state, a reflect array radar, or the like.

In some demonstrative aspects, radar device 101 may include an antenna arrangement 102, a radar frontend 103 configured to communicate radar signals via the antenna arrangement 102, and a radar processor 104 configured to generate radar information based on the radar signals, e.g., as described below.

In some demonstrative aspects, radar processor 104 may be configured to process radar information of radar device 101 and/or to control one or more operations of radar device 101, e.g., as described below.

In some demonstrative aspects, radar processor 104 may include, or may be implemented, partially or entirely, by circuitry and/or logic, e.g., one or more processors including circuitry and/or logic, memory circuitry and/or logic. Additionally or alternatively, one or more functionalities of radar processor 104 may be implemented by logic, which may be executed by a machine and/or one or more processors, e.g., as described below.

In one example, radar processor 104 may include at least one memory, e.g., coupled to the one or more processors, which may be configured, for example, to store, e.g., at least temporarily, at least some of the information processed by the one or more processors and/or circuitry, and/or which may be configured to store logic to be utilized by the processors and/or circuitry.

In other aspects, radar processor 104 may be implemented by one or more additional or alternative elements of vehicle 100.

In some demonstrative aspects, radar frontend 103 may include, for example, one or more (radar) transmitters, and a one or more (radar) receivers, e.g., as described below.

In some demonstrative aspects, antenna arrangement 102 may include a plurality of antennas to communicate the radar signals. For example, antenna arrangement 102 may include multiple transmit antennas in the form of a transmit antenna array, and multiple receive antennas in the form of a receive antenna array. In another example, antenna arrangement 102 may include one or more antennas used both as transmit and receive antennas. In the latter case, the radar frontend 103, for example, may include a duplexer or a circulator, e.g., a circuit to separate transmitted signals from received signals.

In some demonstrative aspects, as shown in FIG. 1, the radar frontend 103 and the antenna arrangement 102 may be controlled, e.g., by radar processor 104, to transmit a radio transmit signal 105.

In some demonstrative aspects, as shown in FIG. 1, the radio transmit signal 105 may be reflected by an object 106, resulting in an echo 107.

In some demonstrative aspects, the radar device 101 may receive the echo 107, e.g., via antenna arrangement 102 and radar frontend 103, and radar processor 104 may generate radar information, for example, by calculating information about position, radial velocity (Doppler), and/or direction of the object 106, e.g., with respect to vehicle 100.

In some demonstrative aspects, radar processor 104 may be configured to provide the radar information to a vehicle controller 108 of the vehicle 100, e.g., for autonomous driving of the vehicle 100.

In some demonstrative aspects, at least part of the functionality of radar processor 104 may be implemented as part of vehicle controller 108. In other aspects, the functionality of radar processor 104 may be implemented as part of any other element of radar device 101 and/or vehicle 100. In other aspects, radar processor 104 may be implemented, as a separate part of, or as part of any other element of radar device 101 and/or vehicle 100.

In some demonstrative aspects, vehicle controller 108 may be configured to control one or more functionalities, modes of operation, components, devices, systems and/or elements of vehicle 100.

In some demonstrative aspects, vehicle controller 108 may be configured to control one or more vehicular systems of vehicle 100, e.g., as described below.

In some demonstrative aspects, the vehicular systems may include, for example, a steering system, a braking system, a driving system, and/or any other system of the vehicle 100.

In some demonstrative aspects, vehicle controller 108 may configured to control radar device 101, and/or to process one or parameters, attributes and/or information from radar device 101.

In some demonstrative aspects, vehicle controller 108 may be configured, for example, to control the vehicular systems of the vehicle 100, for example, based on radar information from radar device 101 and/or one or more other sensors of the vehicle 100, e.g., Light Detection and Ranging (LIDAR) sensors, camera sensors, and/or the like.

In one example, vehicle controller 108 may control the steering system, the braking system, and/or any other vehicular systems of vehicle 100, for example, based on the information from radar device 101, e.g., based on one or more objects detected by radar device 101.

In other aspects, vehicle controller 108 may be configured to control any other additional or alternative functionalities of vehicle 100.

Some demonstrative aspects are described herein with respect to a radar device 101 implemented in a vehicle, e.g., vehicle 100. In other aspects a radar device, e.g., radar device 101, may be implemented as part of any other element of a traffic system or network, for example, as part of a road infrastructure, and/or any other element of a traffic network or system. Other aspects may be implemented with respect to any other system, environment and/or apparatus, which may be implemented in any other object, environment, location, or place. For example, radar device 101 may be part of a non-vehicular device, which may be implemented, for example, in an indoor location, a stationary infrastructure outdoors, or any other location.

In some demonstrative aspects, radar device 101 may be configured to support security usage. In one example, radar device 101 may be configured to determine a nature of an operation, e.g., a human entry, an animal entry, an environmental movement, and the like, to identity a threat level of a detected event, and/or any other additional or alternative operations.

Some demonstrative aspects may be implemented with respect to any other additional or alternative devices and/or systems, for example, for a robot, e.g., as described below.

In other aspects, radar device 101 may be configured to support any other usages and/or applications.

Figure 2:
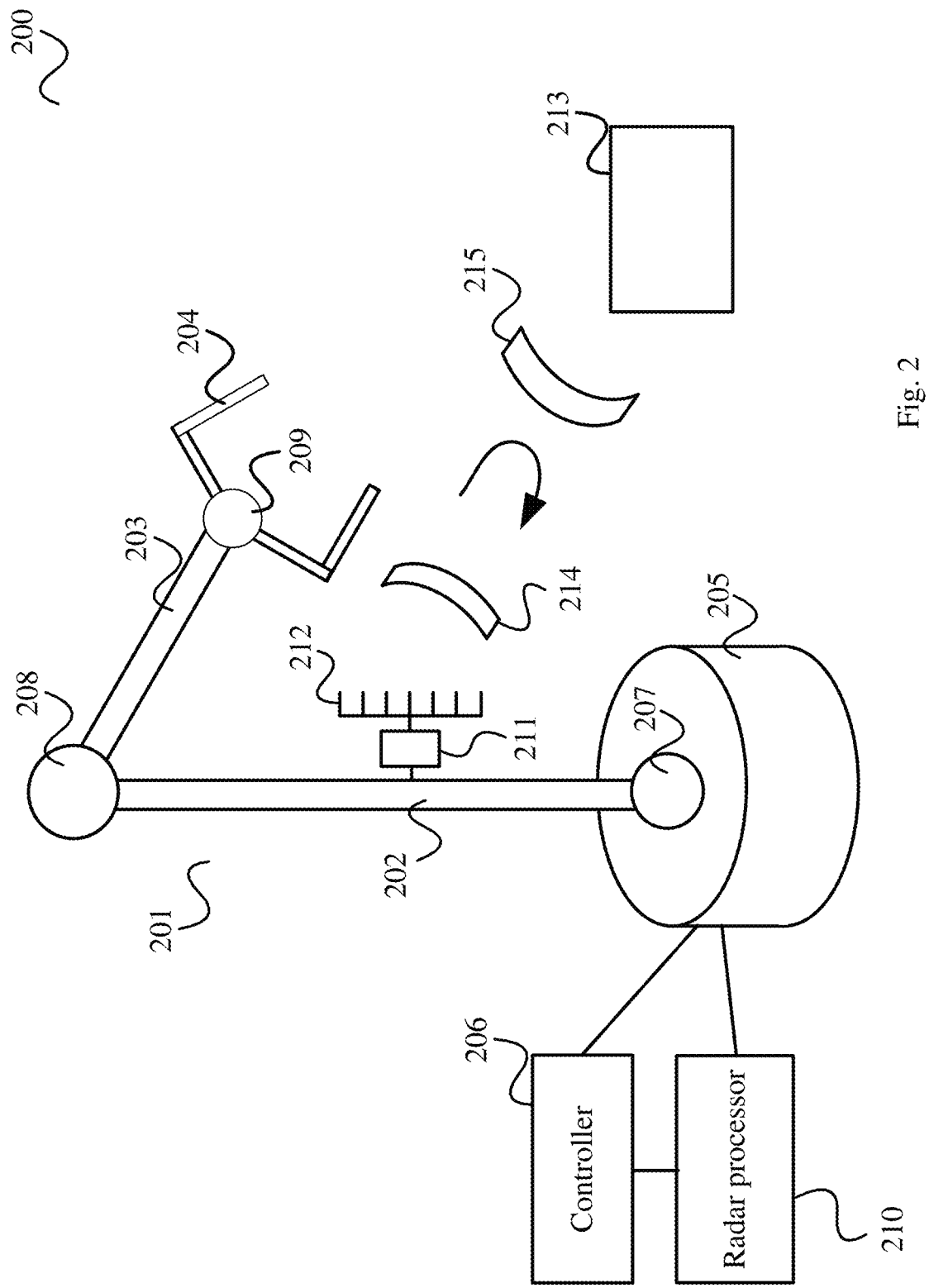
FIG. 2 is a schematic block diagram illustration of a robot implementing a radar, in accordance with some demonstrative aspects.

Reference is now made to FIG. 2, which schematically illustrates a block diagram of a robot 200 implementing a radar, in accordance with some demonstrative aspects.

In some demonstrative aspects, robot 200 may include a robot arm 201. The robot 200 may be implemented, for example, in a factory for handling an object 213, which may be, for example, a part that should be affixed to a product that is being manufactured. The robot arm 201 may include a plurality of movable members, for example, movable members 202, 203, 204, and a support 205. Moving the movable members 202, 203, and/or 204 of the robot arm 201, e.g., by actuation of associated motors, may allow physical interaction with the environment to carry out a task, e.g., handling the object 213.

In some demonstrative aspects, the robot arm 201 may include a plurality of joint elements, e.g., joint elements 207, 208, 209, which may connect, for example, the members 202, 203, and/or 204 with each other, and with the support 205. For example, a joint element 207, 208, 209 may have one or more joints, each of which may provide rotatable motion, e.g., rotational motion, and/or translatory motion, e.g., displacement, to associated members and/or motion of members relative to each other. The movement of the members 202, 203, 204 may be initiated by suitable actuators.

In some demonstrative aspects, the member furthest from the support 205, e.g., member 204, may also be referred to as the end-effector 204 and may include one or more tools, such as, a claw for gripping an object, a welding tool, or the like. Other members, e.g., members 202, 203, closer to the support 205, may be utilized to change the position of the end-effector 204, e.g., in three-dimensional space. For example, the robot arm 201 may be configured to function similarly to a human arm, e.g., possibly with a tool at its end.

In some demonstrative aspects, robot 200 may include a (robot) controller 206 configured to implement interaction with the environment, e.g., by controlling the robot arm's actuators, according to a control program, for example, in order to control the robot arm 201 according to the task to be performed.

In some demonstrative aspects, an actuator may include a component adapted to affect a mechanism or process in response to being driven. The actuator can respond to commands given by the controller 206 (the so-called activation) by performing mechanical movement. This means that an actuator, typically a motor (or electromechanical converter), may be configured to convert electrical energy into mechanical energy when it is activated (i.e. actuated).

In some demonstrative aspects, controller 206 may be in communication with a radar processor 210 of the robot 200.

In some demonstrative aspects, a radar fronted 211 and a radar antenna arrangement 212 may be coupled to the radar processor 210. In one example, radar fronted 211 and/or radar antenna arrangement 212 may be included, for example, as part of the robot arm 201.

In some demonstrative aspects, the radar frontend 211, the radar antenna arrangement 212 and the radar processor 210 may be operable as, and/or may be configured to form, a radar device. For example, antenna arrangement 212 may be configured to perform one or more functionalities of antenna arrangement 102 (FIG. 1), radar frontend 211 may be configured to perform one or more functionalities of radar frontend 103 (FIG. 1), and/or radar processor 210 may be configured to perform one or more functionalities of radar processor 104 (FIG. 1), e.g., as described above.

In some demonstrative aspects, for example, the radar frontend 211 and the antenna arrangement 212 may be controlled, e.g., by radar processor 210, to transmit a radio transmit signal 214.

In some demonstrative aspects, as shown in FIG. 2, the radio transmit signal 214 may be reflected by the object 213, resulting in an echo 215.

In some demonstrative aspects, the echo 215 may be received, e.g., via antenna arrangement 212 and radar frontend 211, and radar processor 210 may generate radar information, for example, by calculating information about position, speed (Doppler) and/or direction of the object 213, e.g., with respect to robot arm 201.

In some demonstrative aspects, radar processor 210 may be configured to provide the radar information to the robot controller 206 of the robot arm 201, e.g., to control robot arm 201. For example, robot controller 206 may be configured to control robot arm 201 based on the radar information, e.g., to grab the object 213 and/or to perform any other operation.

Figure 3:
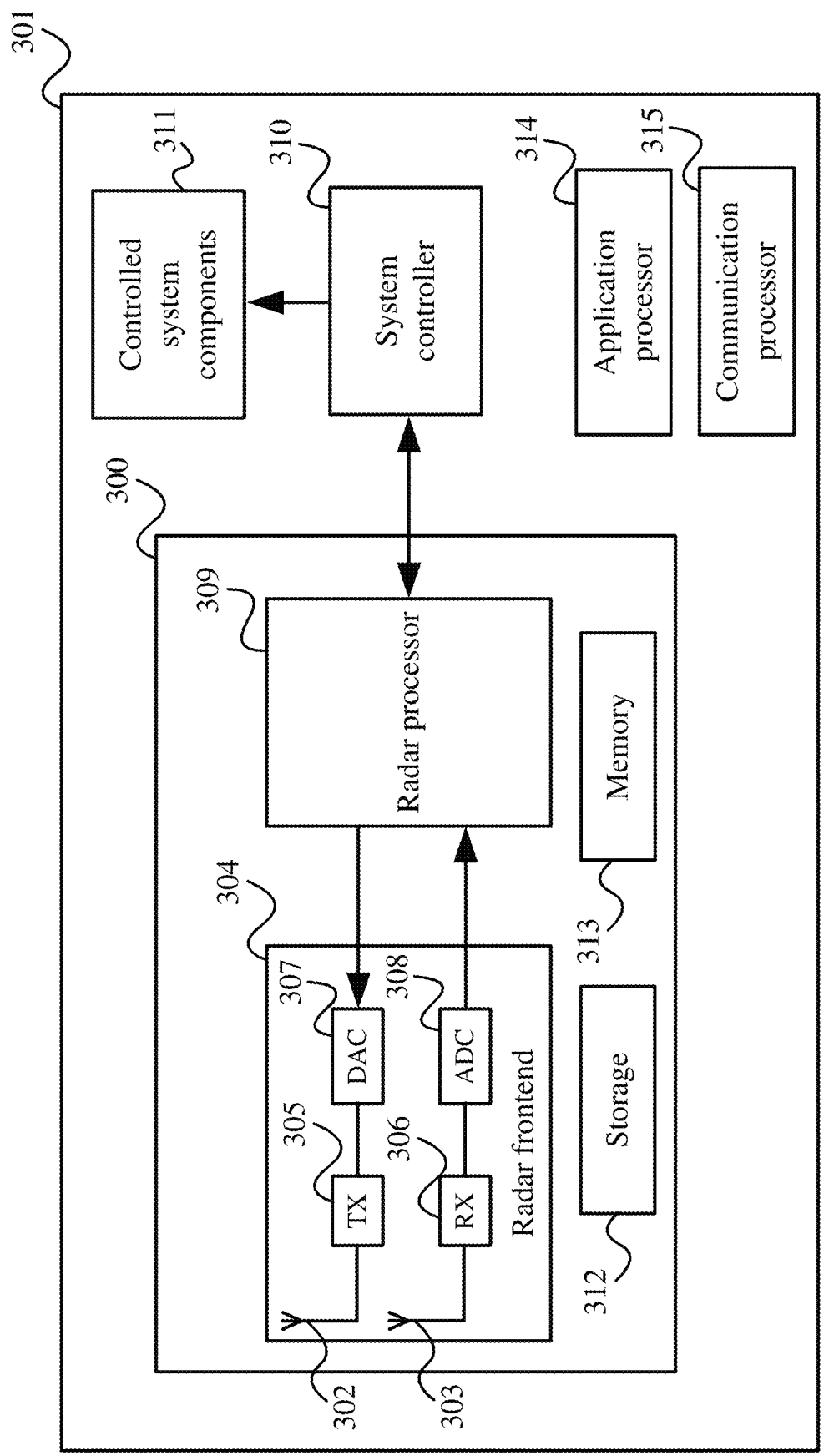
FIG. 3 is a schematic block diagram illustration of a radar apparatus, in accordance with some demonstrative aspects.

Reference is made to FIG. 3, which schematically illustrates a radar apparatus 300, in accordance with some demonstrative aspects.

In some demonstrative aspects, radar apparatus 300 may be implemented as part of a device or system 301, e.g., as described below.

For example, radar apparatus 300 may be implemented as part of, and/or may configured to perform one or more operations and/or functionalities of, the devices or systems described above with reference to FIG. 1 an/or FIG. 2. In other aspects, radar apparatus 300 may be implemented as part of any other device or system 301.

In some demonstrative aspects, radar device 300 may include an antenna arrangement, which may include one or more transmit antennas 302 and one or more receive antennas 303. In other aspects, any other antenna arrangement may be implemented.

In some demonstrative aspects, radar device 300 may include a radar frontend 304, and a radar processor 309.

In some demonstrative aspects, as shown in FIG. 3, the one or more transmit antennas 302 may be coupled with a transmitter (or transmitter arrangement) 305 of the radar frontend 304; and/or the one or more receive antennas 303 may be coupled with a receiver (or receiver arrangement) 306 of the radar frontend 304, e.g., as described below.

In some demonstrative aspects, transmitter 305 may include one or more elements, for example, an oscillator, a power amplifier and/or one or more other elements, configured to generate radio transmit signals to be transmitted by the one or more transmit antennas 302, e.g., as described below.

In some demonstrative aspects, for example, radar processor 309 may provide digital radar transmit data values to the radar frontend 304. For example, radar frontend 304 may include a Digital-to-Analog Converter (DAC) 307 to convert the digital radar transmit data values to an analog transmit signal. The transmitter 305 may convert the analog transmit signal to a radio transmit signal which is to be transmitted by transmit antennas 302.

In some demonstrative aspects, receiver 306 may include one or more elements, for example, one or more mixers, one or more filters and/or one or more other elements, configured to process, down-convert, radio signals received via the one or more receive antennas 303, e.g., as described below.

In some demonstrative aspects, for example, receiver 306 may convert a radio receive signal received via the one or more receive antennas 303 into an analog receive signal. The radar frontend 304 may include an Analog-to-Digital Converter (ADC) 308 to generate digital radar reception data values based on the analog receive signal. For example, radar frontend 304 may provide the digital radar reception data values to the radar processor 309.

In some demonstrative aspects, radar processor 309 may be configured to process the digital radar reception data values, for example, to detect one or more objects, e.g., in an environment of the device/system 301. This detection may include, for example, the determination of information including one or more of range, speed (Doppler), direction, and/or any other information, of one or more objects, e.g., with respect to the system 301.

In some demonstrative aspects, radar processor 309 may be configured to provide the determined radar information to a system controller 310 of device/system 301. For example, system controller 310 may include a vehicle controller, e.g., if device/system 301 includes a vehicular device/system, a robot controller, e.g., if device/system 301 includes a robot device/system, or any other type of controller for any other type of device/system 301.

In some demonstrative aspects, system controller 310 may be configured to control one or more controlled system components 311 of the system 301, e.g. a motor, a brake, steering, and the like, e.g. by one or more corresponding actuators.

In some demonstrative aspects, radar device 300 may include a storage 312 or a memory 313, e.g., to store information processed by radar 300, for example, digital radar reception data values being processed by the radar processor 309, radar information generated by radar processor 309, and/or any other data to be processed by radar processor 309.

In some demonstrative aspects, device/system 301 may include, for example, an application processor 314 and/or a communication processor 315, for example, to at least partially implement one or more functionalities of system controller 310 and/or to perform communication between system controller 310, radar device 300, the controlled system components 311, and/or one or more additional elements of device/system 301.

In some demonstrative aspects, radar device 300 may be configured to generate and transmit the radio transmit signal in a form, which may support determination of range, speed, and/or direction, e.g., as described below.

For example, a radio transmit signal of a radar may be configured to include a plurality of pulses. For example, a pulse transmission may include the transmission of short high-power bursts in combination with times during which the radar device listens for echoes.

For example, in order to more optimally support a highly dynamic situation, e.g., in an automotive scenario, a continuous wave (CW) may instead be used as the radio transmit signal. However, a continuous wave, e.g., with constant frequency, may support velocity determination, but may not allow range determination, e.g., due to the lack of a time mark that could allow distance calculation.

In some demonstrative aspects, radio transmit signal 105 (FIG. 1) may be transmitted according to technologies such as, for example, Frequency-Modulated continuous wave (FMCW) radar, Phase-Modulated Continuous Wave (PMCW) radar, Orthogonal Frequency Division Multiplexing (OFDM) radar, and/or any other type of radar technology, which may support determination of range, velocity, and/or direction, e.g., as described below.

Figure 4:
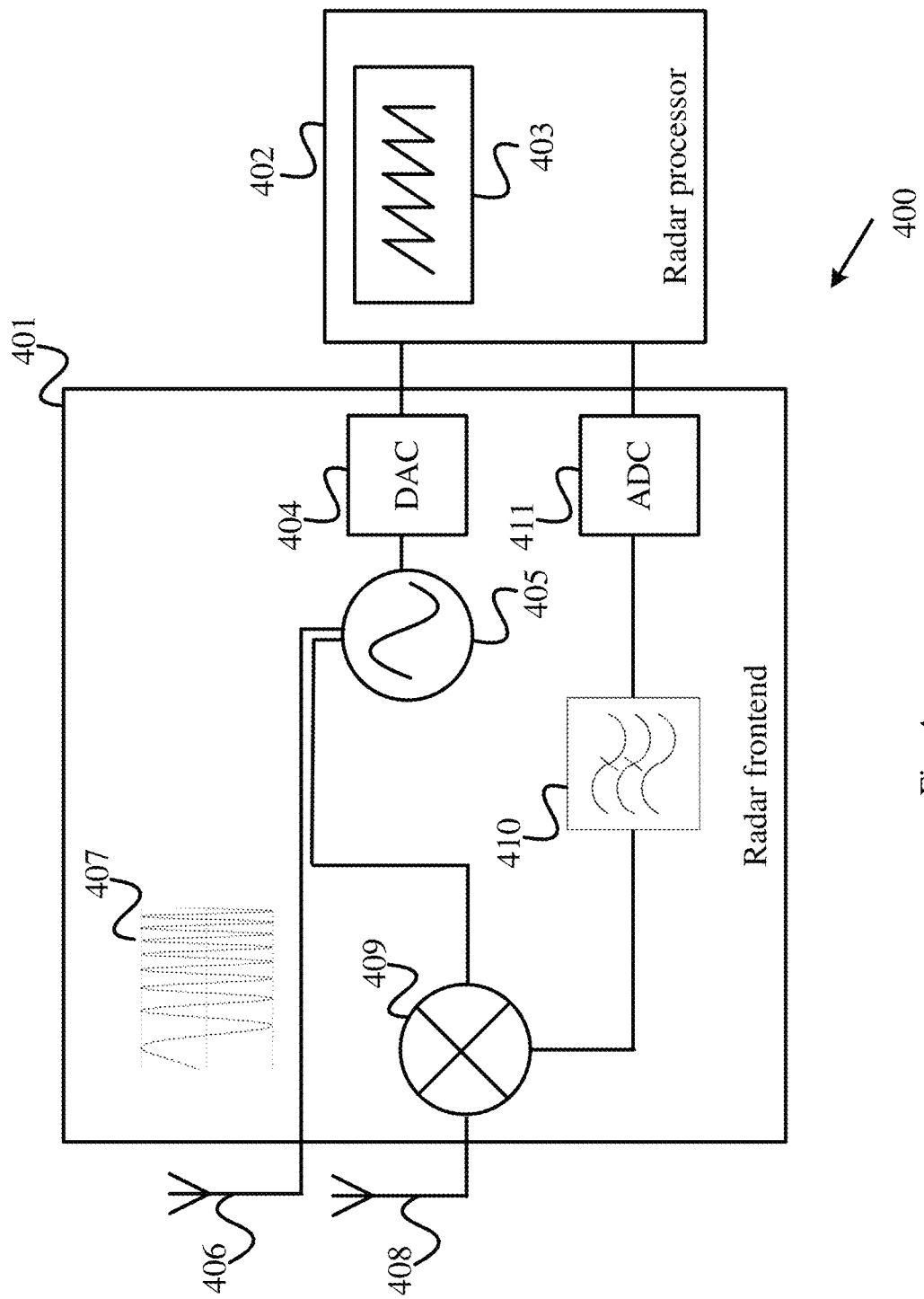
FIG. 4 is a schematic block diagram illustration of a Frequency-Modulated Continuous Wave (FMCW) radar apparatus, in accordance with some demonstrative aspects.

Reference is made to FIG. 4, which schematically illustrates a FMCW radar apparatus, in accordance with some demonstrative aspects.

In some demonstrative aspects, FMCW radar device 400 may include a radar frontend 401, and a radar processor 402. For example, radar frontend 304 (FIG. 3) may include one or more elements of, and/or may perform one or more operations and/or functionalities of, radar frontend 401; and/or radar processor 309 (FIG. 3) may include one or more elements of, and/or may perform one or more operations and/or functionalities of, radar processor 402.

In some demonstrative aspects, FMCW radar device 400 may be configured to communicate radio signals according to an FMCW radar technology, e.g., rather than sending a radio transmit signal with a constant frequency.

In some demonstrative aspects, radio frontend 401 may be configured to ramp up and reset the frequency of the transmit signal, e.g., periodically, for example, according to a saw tooth waveform 403. In other aspects, a triangle waveform, or any other suitable waveform may be used.

In some demonstrative aspects, for example, radar processor 402 may be configured to provide waveform 403 to frontend 401, for example, in digital form, e.g., as a sequence of digital values.

In some demonstrative aspects, radar frontend 401 may include a DAC 404 to convert waveform 403 into analog form, and to supply it to a voltage-controlled oscillator 405. For example, oscillator 405 may be configured to generate an output signal, which may be frequency-modulated in accordance with the waveform 403.

In some demonstrative aspects, oscillator 405 may be configured to generate the output signal including a radio transmit signal, which may be fed to and sent out by one or more transmit antennas 406.

In some demonstrative aspects, the radio transmit signal generated by the oscillator 405 may have the form of a sequence of chirps 407, which may be the result of the modulation of a sinusoid with the saw tooth waveform 403.

In one example, a chirp 407 may correspond to the sinusoid of the oscillator signal frequency-modulated by a "tooth" of the saw tooth waveform 403, e.g., from the minimum frequency to the maximum frequency.

In some demonstrative aspects, FMCW radar device 400 may include one or more receive antennas 408 to receive a radio receive signal. The radio receive signal may be based on the echo of the radio transmit signal, e.g., in addition to any noise, interference, or the like.

In some demonstrative aspects, radar frontend 401 may include a mixer 409 to mix the radio transmit signal with the radio receive signal into a mixed signal.

In some demonstrative aspects, radar frontend 401 may include a filter, e.g., a Low Pass Filter (LPF) 410, which may be configured to filter the mixed signal from the mixer 409 to provide a filtered signal. For example, radar frontend 401 may include an ADC 411 to convert the filtered signal into digital reception data values, which may be provided to radar processor 402. In another example, the filter 410 may be a digital filter, and the ADC 411 may be arranged between the mixer 409 and the filter 410.

In some demonstrative aspects, radar processor 402 may be configured to process the digital reception data values to provide radar information, for example, including range, speed (velocity/Doppler), and/or direction (AoA) information of one or more objects.

In some demonstrative aspects, radar processor 402 may be configured to perform a first Fast Fourier Transform (FFT) (also referred to as "range FFT") to extract a delay response, which may be used to extract range information, and/or a second FFT (also referred to as "Doppler FFT") to extract a Doppler shift response, which may be used to extract velocity information, from the digital reception data values.

In other aspects, any other additional or alternative methods may be utilized to extract range information. In one example, in a digital radar implementation, a correlation with the transmitted signal may be used, e.g., according to a matched filter implementation.

Figure 5:
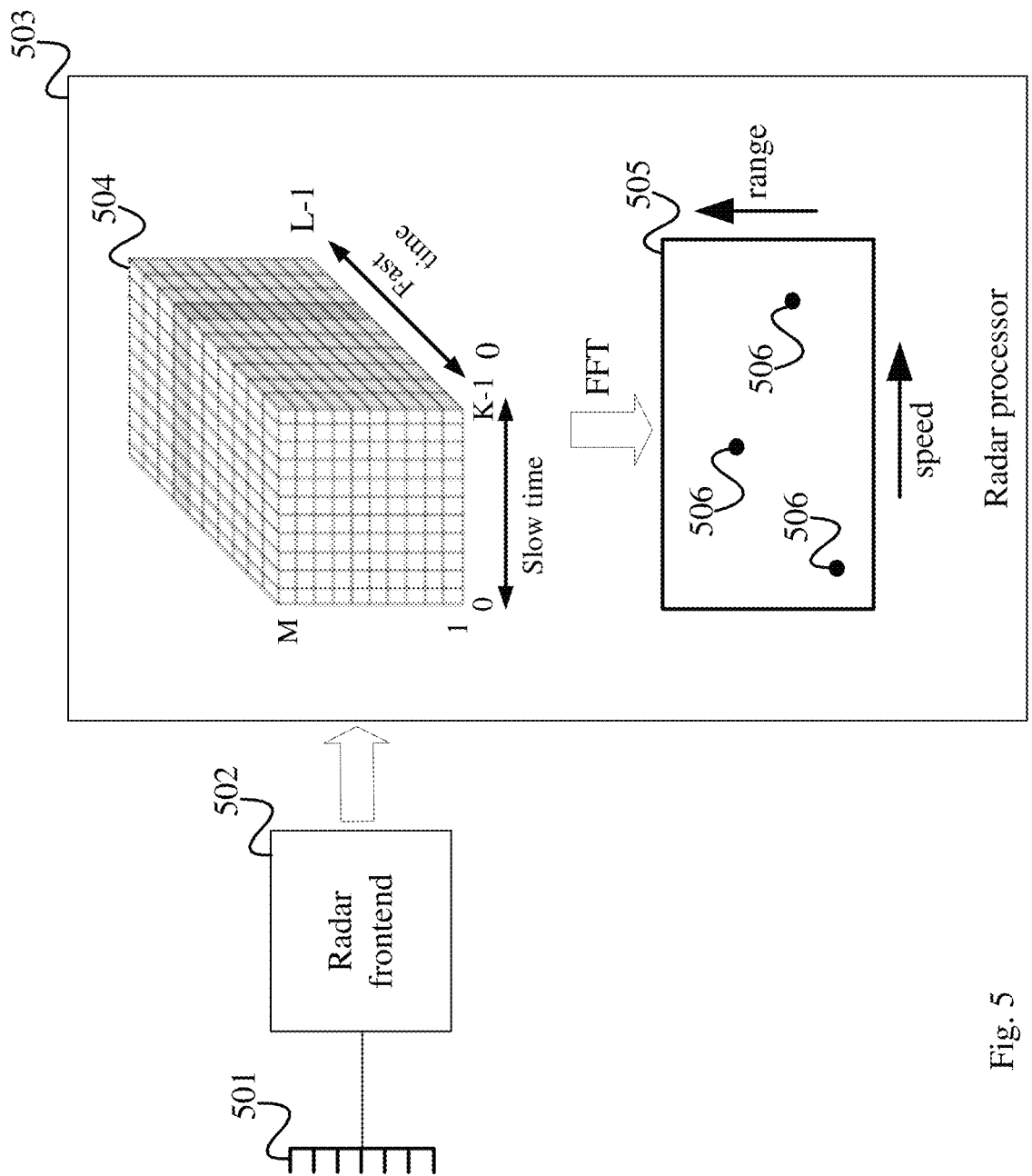
FIG. 5 is a schematic illustration of an extraction scheme, which may be implemented to extract range and speed (Doppler) estimations from digital reception radar data values, in accordance with some demonstrative aspects.

Reference is made to FIG. 5, which schematically illustrates an extraction scheme, which may be implemented to extract range and speed (Doppler) estimations from digital reception radar data values, in accordance with some demonstrative aspects. For example, radar processor 104 (FIG. 1), radar processor 210 (FIG. 2), radar processor 309 (FIG. 3), and/or radar processor 402 (FIG. 4), may be configured to extract range and/or speed (Doppler) estimations from digital reception radar data values according to one or more aspects of the extraction scheme of FIG. 5.

In some demonstrative aspects, as shown in FIG. 5, a radio receive signal, e.g., including echoes of a radio transmit signal, may be received by a receive antenna array 501. The radio receive signal may be processed by a radio radar frontend 502 to generate digital reception data values, e.g., as described above. The radio radar frontend 502 may provide the digital reception data values to a radar processor 503, which may process the digital reception data values to provide radar information, e.g., as described above.

In some demonstrative aspects, the digital reception data values may be represented in the form of a data cube 504. For example, the data cube 504 may include digitized samples of the radio receive signal, which is based on a radio signal transmitted from a transmit antenna and received by M receive antennas. In some demonstrative aspects, for example, with respect to a MIMO implementation, there may be multiple transmit antennas, and the number of samples may be multiplied accordingly.

In some demonstrative aspects, a layer of the data cube 504, for example, a horizontal layer of the data cube 504, may include samples of an antenna, e.g., a respective antenna of the M antennas.

In some demonstrative aspects, data cube 504 may include samples for K chirps. For example, as shown in FIG. 5, the samples of the chirps may be arranged in a so-called "slow time"-direction.

In some demonstrative aspects, the data cube 504 may include L samples, e.g., L=512 or any other number of samples, for a chirp, e.g., per each chirp. For example, as shown in FIG. 5, the samples per chirp may be arranged in a so-called "fast time"-direction of the data cube 504.

In some demonstrative aspects, radar processor 503 may be configured to process a plurality of samples, e.g., L samples collected for each chirp and for each antenna, by a first FFT. The first FFT may be performed, for example, for each chirp and each antenna, such that a result of the processing of the data cube 504 by the first FFT may again have three dimensions, and may have the size of the data cube 504 while including values for L range bins, e.g., instead of the values for the L sampling times.

In some demonstrative aspects, radar processor 503 may be configured to process the result of the processing of the data cube 504 by the first FFT, for example, by processing the result according to a second FFT along the chirps, e.g., for each antenna and for each range bin.

For example, the first FFT may be in the "fast time" direction, and the second FFT may be in the "slow time" direction.

In some demonstrative aspects, the result of the second FFT may provide, e.g., when aggregated over the antennas, a range/Doppler (R/D) map 505. The R/D map may have FFT peaks 506, for example, including peaks of FFT output values (in terms of absolute values) for certain range/speed combinations, e.g., for range/Doppler bins. For example, a range/Doppler bin may correspond to a range bin and a Doppler bin. For example, radar processor 503 may consider a peak as potentially corresponding to an object, e.g., of the range and speed corresponding to the peak's range bin and speed bin.

In some demonstrative aspects, the extraction scheme of FIG. 5 may be implemented for an FMCW radar, e.g., FMCW radar 400 (FIG. 4), as described above. In other aspects, the extraction scheme of FIG. 5 may be implemented for any other radar type. In one example, the radar processor 503 may be configured to determine a range/

Doppler map 505 from digital reception data values of a PMCW radar, an OFDM radar, or any other radar technologies. For example, in adaptive or cognitive radar, the pulses in a frame, the waveform and/or modulation may be changed over time, e.g., according to the environment.

Referring back to FIG. 3, in some demonstrative aspects, receive antenna arrangement 303 may be implemented using a receive antenna array having a plurality of receive antennas (or receive antenna elements). For example, radar processor 309 may be configured to determine an angle of arrival of the received radio signal, e.g., echo 107 (FIG. 1) and/or echo 215 (FIG. 2). For example, radar processor 309 may be configured to determine a direction of a detected object, e.g., with respect to the device/system 301, for example, based on the angle of arrival of the received radio signal, e.g., as described below.

Figure 6:
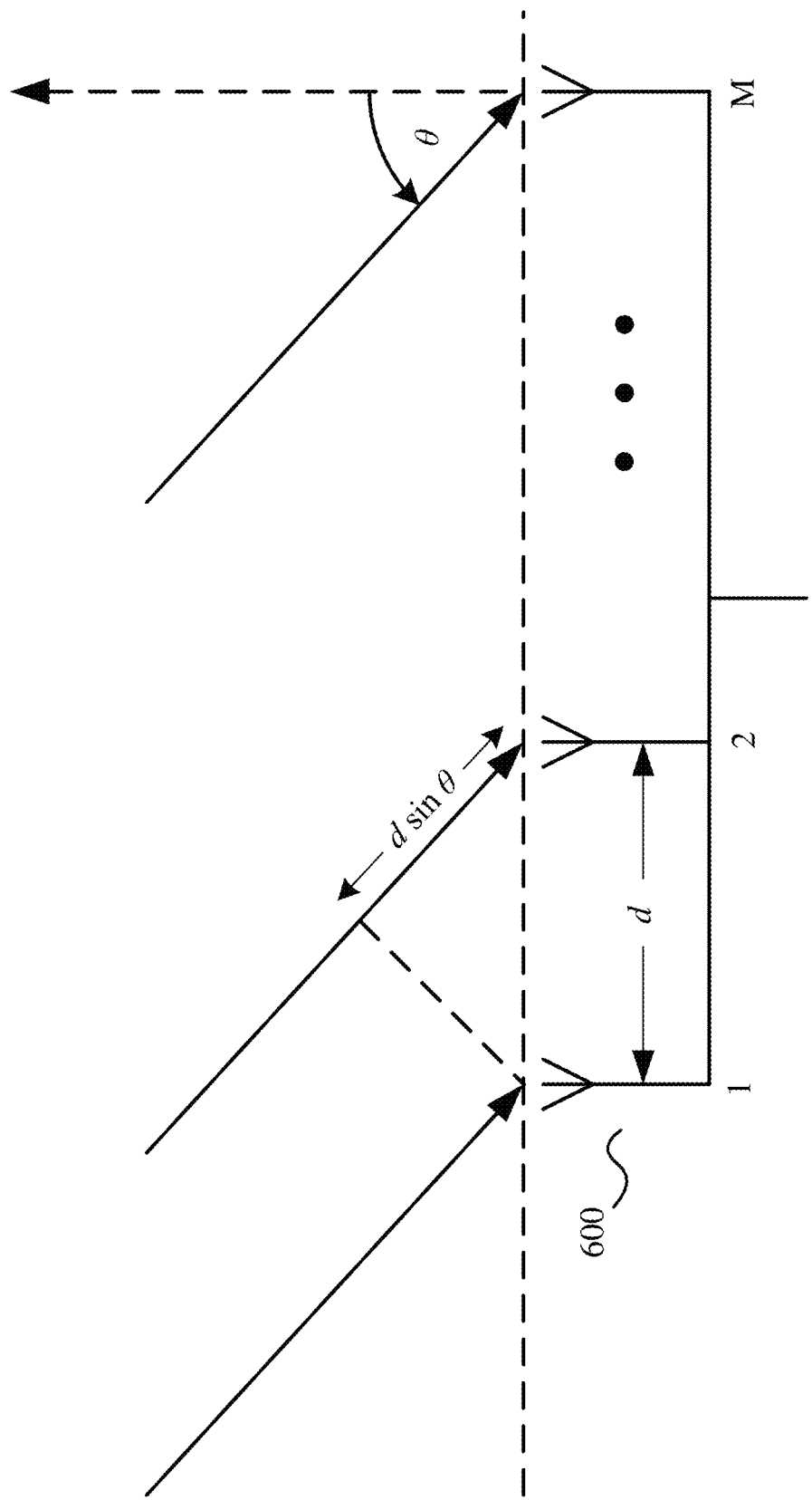
FIG. 6 is a schematic illustration of an angle-determination scheme, which may be implemented to determine Angle of Arrival (AoA) information based on an incoming radio signal received by a receive antenna array, in accordance with some demonstrative aspects.

Reference is made to FIG. 6, which schematically illustrates an angle-determination scheme, which may be implemented to determine Angle of Arrival (AoA) information based on an incoming radio signal received by a receive antenna array 600, in accordance with some demonstrative aspects.

FIG. 6 depicts an angle-determination scheme based on received signals at the receive antenna array. In some demonstrative aspects, for example, in a virtual MIMO array, the angle-determination may also be based on the signals transmitted by the array of Tx antennas.

FIG. 6 depicts a one-dimensional angle-determination scheme. Other multi-dimensional angle determination schemes, e.g., a two-dimensional scheme or a three-dimensional scheme, may be implemented.

In some demonstrative aspects, as shown in FIG. 6, the receive antenna array 600 may include M antennas (numbered, from left to right, 1 to M).

As shown by the arrows in FIG. 6, it is assumed that an echo is coming from an object located at the top left direction. Accordingly, the direction of the echo, e.g., the incoming radio signal, may be towards the bottom right. According to this example, the further to the left a receive antenna is located, the earlier it will receive a certain phase of the incoming radio signal.

For example, a phase difference, denoted $\Delta\varphi$, between two antennas of the receive antenna array 600 may be determined, e.g., as follows:

$$\Delta\varphi = \frac{2\pi}{\lambda} \cdot d \cdot \sin(\theta)$$

wherein $\lambda$ denotes a wavelength of the incoming radio signal, d denotes a distance between the two antennas, and $\theta$ denotes an angle of arrival of the incoming radio signal, e.g., with respect to a normal direction of the array.

In some demonstrative aspects, radar processor 309 (FIG. 3) may be configured to utilize this relationship between phase and angle of the incoming radio signal, for example, to determine the angle of arrival of echoes, for example by performing an FFT, e.g., a third FFT ("angular FFT") over the antennas.

In some demonstrative aspects, multiple transmit antennas, e.g., in the form of an antenna array having multiple transmit antennas, may be used, for example, to increase the spatial resolution, e.g., to provide high-resolution radar information. For example, a MIMO radar device may utilize a virtual MIMO radar antenna, which may be formed as a convolution of a plurality of transmit antennas convolved with a plurality of receive antennas.

Figure 7:
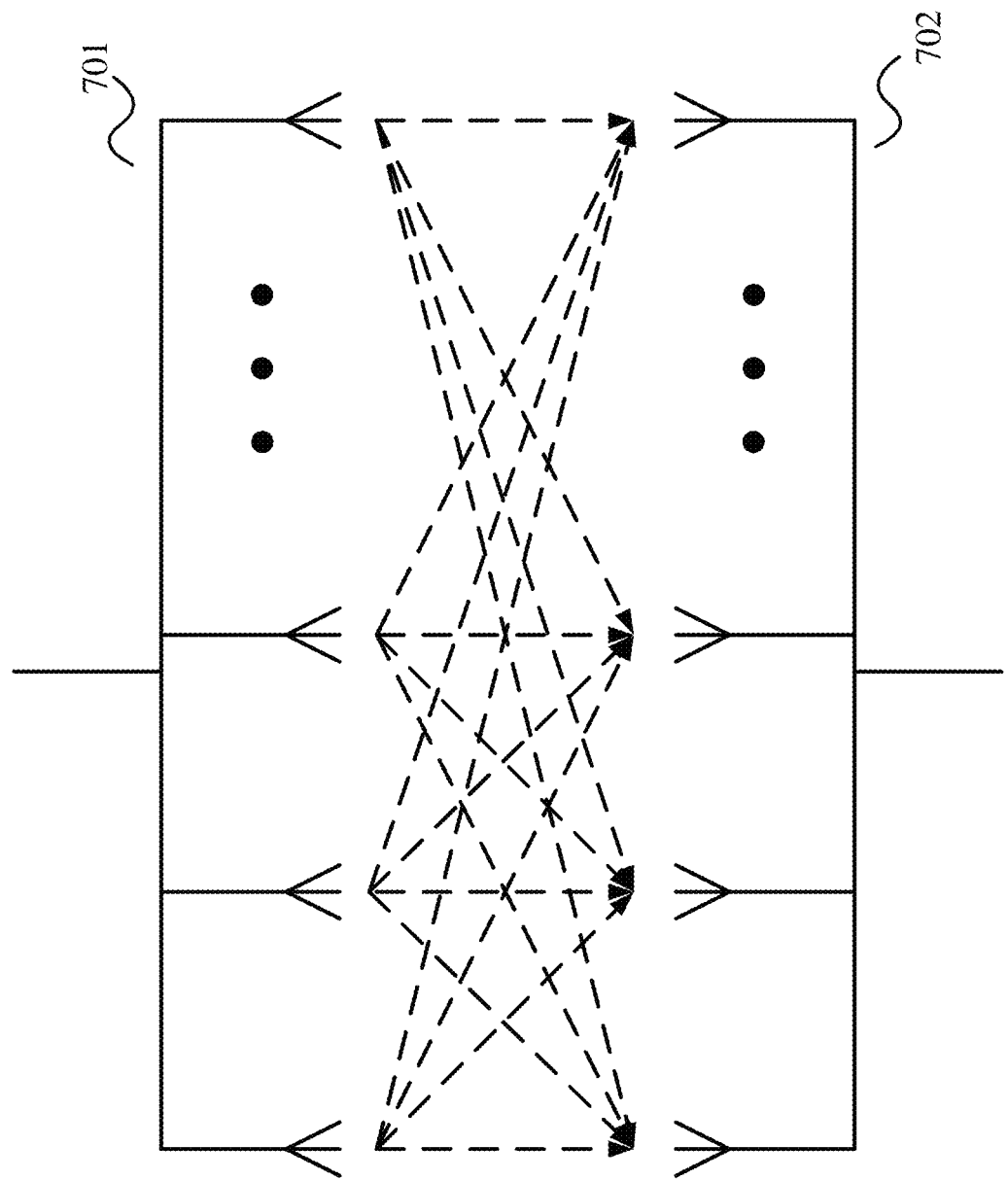
FIG. 7 is a schematic illustration of a Multiple-Input-Multiple-Output (MIMO) radar antenna scheme, which may be implemented based on a combination of Transmit (Tx) and Receive (Rx) antennas, in accordance with some demonstrative aspects.

Reference is made to FIG. 7, which schematically illustrates a MIMO radar antenna scheme, which may be implemented based on a combination of Transmit (Tx) and Receive (Rx) antennas, in accordance with some demonstrative aspects.

In some demonstrative aspects, as shown in FIG. 7, a radar MIMO arrangement may include a transmit antenna array 701 and a receive antenna array 702. For example, the one or more transmit antennas 302 (FIG. 3) may be implemented to include transmit antenna array 701, and/or the one or more receive antennas 303 (FIG. 3) may be implemented to include receive antenna array 702.

In some demonstrative aspects, antenna arrays including multiple antennas both for transmitting the radio transmit signals and for receiving echoes of the radio transmit signals, may be utilized to provide a plurality of virtual channels as illustrated by the dashed lines in FIG. 7. For example, a virtual channel may be formed as a convolution, for example, as a Kronecker product, between a transmit antenna and a receive antenna, e.g., representing a virtual steering vector of the MIMO radar.

In some demonstrative aspects, a transmit antenna, e.g., each transmit antenna, may be configured to send out an individual radio transmit signal, e.g., having a phase associated with the respective transmit antenna.

For example, an array of N transmit antennas and M receive antennas may be implemented to provide a virtual MIMO array of size N×M. For example, the virtual MIMO array may be formed according to the Kronecker product operation applied to the Tx and Rx steering vectors.

Figure 8:
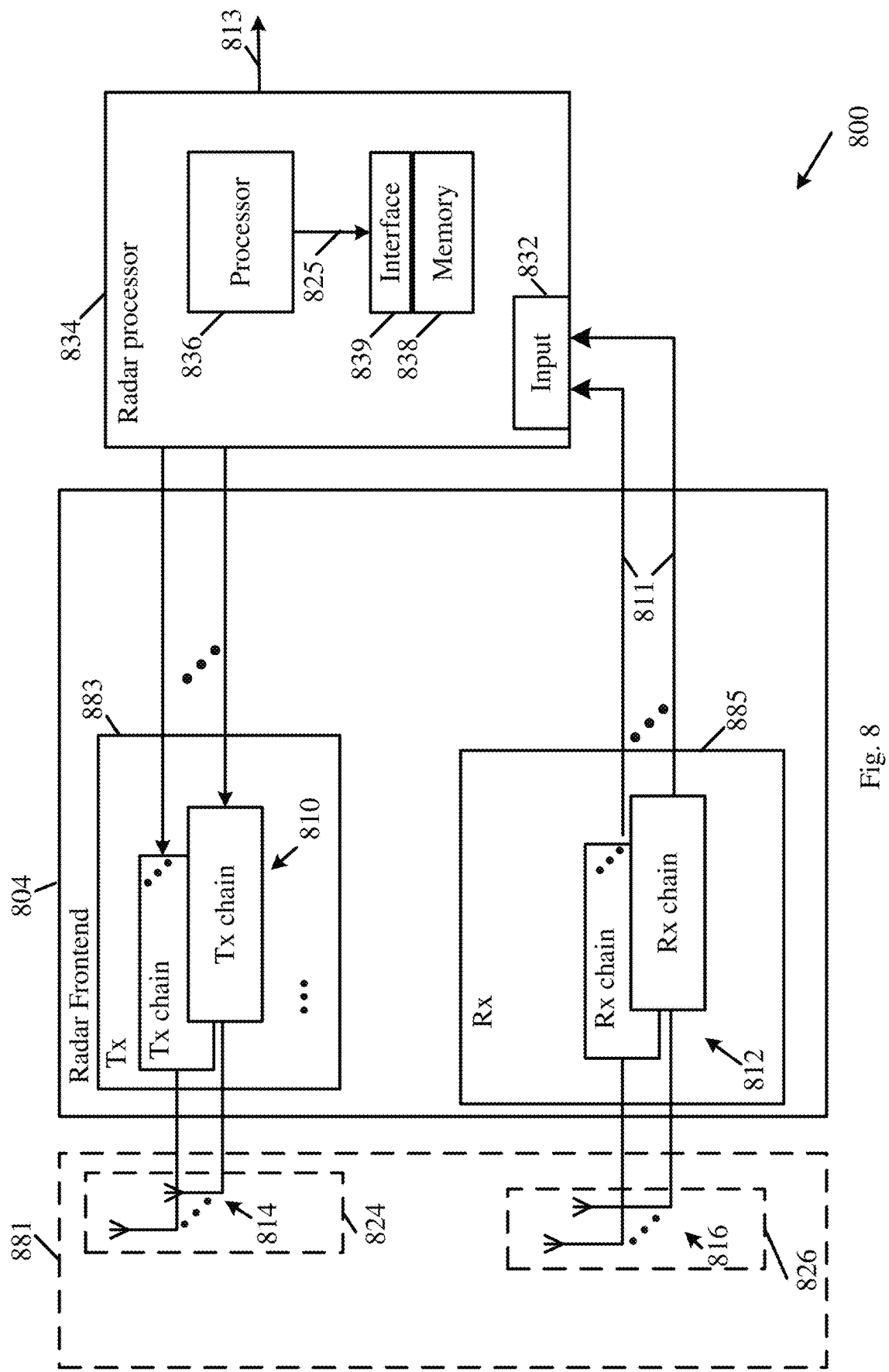
FIG. 8 is a schematic block diagram illustration of elements of a radar device including a radar frontend and a radar processor, in accordance with some demonstrative aspects.

FIG. 8 is a schematic block diagram illustration of elements of a radar device 800, in accordance with some demonstrative aspects. For example, radar device 101 (FIG. 1), radar device 300 (FIG. 3), and/or radar device 400 (FIG. 4), may include one or more elements of radar device 800, and/or may perform one or more operations and/or functionalities of radar device 800.

In some demonstrative aspects, as shown in FIG. 8, radar device 800 may include a radar frontend 804 and a radar processor 834. For example, radar frontend 103 (FIG. 1), radar frontend 211 (FIG. 1), radar frontend 304 (FIG. 3), radar frontend 401 (FIG. 4), and/or radar frontend 502 (FIG. 5), may include one or more elements of radar frontend 804, and/or may perform one or more operations and/or functionalities of radar frontend 804.

In some demonstrative aspects, radar frontend 804 may be implemented as part of a MIMO radar utilizing a MIMO radar antenna 881 including a plurality of Tx antennas 814 configured to transmit a plurality of Tx RF signals (also referred to as "Tx radar signals"); and a plurality of Rx antennas 816 configured to receive a plurality of Rx RF signals (also referred to as "Rx radar signals"), for example, based on the Tx radar signals, e.g., as described below.

In some demonstrative aspects, MIMO antenna array 881, antennas 814, and/or antennas 816 may include or may be part of any type of antennas suitable for transmitting and/or receiving radar signals. For example, MIMO antenna array 881, antennas 814, and/or antennas 816, may be implemented as part of any suitable configuration, structure, and/or arrangement of one or more antenna elements, components, units, assemblies, and/or arrays. For example, MIMO antenna array 881, antennas 814, and/or antennas 816, may be implemented as part of a phased array antenna, a multiple element antenna, a set of switched beam antennas, and/or the like. In some aspects, MIMO antenna array 881, antennas 814, and/or antennas 816, may be implemented to support transmit and receive functionalities using separate transmit and receive antenna elements. In some aspects, MIMO antenna array 881, antennas 814, and/or antennas 816, may be implemented to support transmit and receive functionalities using common and/or integrated transmit/receive elements.

In some demonstrative aspects, MIMO radar antenna 881 may include a rectangular MIMO antenna array, and/or curved array, e.g., shaped to fit a vehicle design. In other aspects, any other form, shape and/or arrangement of MIMO radar antenna 881 may be implemented.

In some demonstrative aspects, radar frontend 804 may include one or more radios configured to generate and transmit the Tx RF signals via Tx antennas 814; and/or to process the Rx RF signals received via Rx antennas 816, e.g., as described below.

In some demonstrative aspects, radar frontend 804 may include at least one transmitter (Tx) 883 including circuitry and/or logic configured to generate and/or transmit the Tx radar signals via Tx antennas 814.

In some demonstrative aspects, radar frontend 804 may include at least one receiver (Rx) 885 including circuitry and/or logic to receive and/or process the Rx radar signals received via Rx antennas 816, for example, based on the Tx radar signals.

In some demonstrative aspects, transmitter 883, and/or receiver 885 may include circuitry; logic; Radio Frequency (RF) elements, circuitry and/or logic; baseband elements, circuitry and/or logic; modulation elements, circuitry and/or logic; demodulation elements, circuitry and/or logic; amplifiers; analog to digital and/or digital to analog converters; filters; and/or the like.

In some demonstrative aspects, transmitter 883 may include a plurality of Tx chains 810 configured to generate and transmit the Tx RF signals via Tx antennas 814, e.g., respectively; and/or receiver 885 may include a plurality of Rx chains 812 configured to receive and process the Rx RF signals received via the Rx antennas 816, e.g., respectively.

In some demonstrative aspects, radar processor 834 may be configured to generate radar information 813, for example, based on the radar signals communicated by MIMO radar antenna 881, e.g., as described below. For example, radar processor 104 (FIG. 1), radar processor 210 (FIG. 2), radar processor 309 (FIG. 3), radar processor 402 (FIG. 4), and/or radar processor 503 (FIG. 5), may include one or more elements of radar processor 834, and/or may perform one or more operations and/or functionalities of radar processor 834.

In some demonstrative aspects, radar processor 834 may be configured to generate radar information 813, for example, based on radar Rx data 811 received from the plurality of Rx chains 812. For example, radar Rx data 811 may be based on the radar Rx signals received via the Rx antennas 816.

In some demonstrative aspects, radar processor 834 may include an input 832 to receive radar input data, e.g., including the radar Rx data 811 from the plurality of Rx chains 812.

In some demonstrative aspects, radar processor 834 may include, or may be implemented, partially or entirely, by circuitry and/or logic, e.g., one or more processors including circuitry and/or logic, memory circuitry and/or logic. Additionally or alternatively, one or more functionalities of radar processor 834 may be implemented by logic, which may be executed by a machine and/or one or more processors, e.g., as described below.

In some demonstrative aspects, radar processor 834 may include at least one processor 836, which may be configured, for example, to process the radar Rx data 811, and/or to perform one or more operations, methods, and/or algorithms.

In some demonstrative aspects, radar processor 834 may include at least one memory 838, e.g., coupled to the processor 836. For example, memory 838 may be configured to store data processed by radar processor 834. For example, memory 838 may store, e.g., at least temporarily, at least some of the information processed by the processor 836, and/or logic to be utilized by the processor 836.

In some demonstrative aspects, processor 836 may interface with memory 838, for example, via a memory interface 839.

In some demonstrative aspects, processor 836 may be configured to access memory 838, e.g., to write data to memory 838 and/or to read data from memory 838, for example, via memory interface 839.

In some demonstrative aspects, memory 838 may be configured to store at least part of the radar data, e.g., some of the radar Rx data or all of the radar Rx data, for example, for processing by processor 836, e.g., as described below.

In some demonstrative aspects, memory 838 may be configured to store processed data, which may be generated by processor 836, for example, during the process of generating the radar information 813, e.g., as described below.

In some demonstrative aspects, memory 838 may be configured to store range information and/or Doppler information, which may be generated by processor 836, for example, based on the radar Rx data. In one example, the range information and/or Doppler information may be determined based on a Cross-Correlation (XCORR) operation, which may be applied to the radar Rx data. Any other additional or alternative operation, algorithm and/or procedure may be utilized to generate the range information and/or Doppler information.

In some demonstrative aspects, memory 838 may be configured to store AoA information, which may be generated by processor 836, for example, based on the radar Rx data, the range information and/or Doppler information. In one example, the AoA information may be determined based on an AoA estimation algorithm. Any other additional or alternative operation, algorithm and/or procedure may be utilized to generate the AoA information.

In some demonstrative aspects, radar processor 834 may be configured to generate the radar information 813 including one or more of range information, Doppler information, and/or AoA information.

In some demonstrative aspects, the radar information 813 may include Point Cloud 1 (PC1) information, for example, including raw point cloud estimations, e.g., Range, Radial Velocity, Azimuth and/or Elevation.

In some demonstrative aspects, the radar information 813 may include Point Cloud 2 (PC2) information, which may be generated, for example, based on the PC1 information. For example, the PC2 information may include clustering information, tracking information, e.g., tracking of probabilities and/or density functions, bounding box information, classification information, orientation information, and the like.

In some demonstrative aspects, the radar information 813 may include target tracking information corresponding to a plurality of targets in an environment of the radar device 800, e.g., as described below.

In some demonstrative aspects, radar processor 834 may be configured to generate the radar information 813 in the form of four Dimensional (4D) image information, e.g., a cube, which may represent 4D information corresponding to one or more detected targets.

In some demonstrative aspects, the 4D image information may include, for example, range values, e.g., based on the range information, velocity values, e.g., based on the Doppler information, azimuth values, e.g., based on azimuth AoA information, elevation values, e.g., based on elevation AoA information, and/or any other values.

In some demonstrative aspects, radar processor 834 may be configured to generate the radar information 813 in any other form, and/or including any other additional or alternative information.

In some demonstrative aspects, radar processor 834 may be configured to process the signals communicated via MIMO radar antenna 881 as signals of a virtual MIMO array formed by a convolution of the plurality of Rx antennas 816 and the plurality of Tx antennas 814.

In some demonstrative aspects, radar frontend 804 and/or radar processor 834 may be configured to utilize MIMO techniques, for example, to support a reduced physical array aperture, e.g., an array size, and/or utilizing a reduced number of antenna elements. For example, radar frontend 804 and/or radar processor 834 may be configured to transmit orthogonal signals via one or more Tx arrays 824 including a plurality of N elements, e.g., Tx antennas 814, and processing received signals via one or more Rx arrays 826 including a plurality of M elements, e.g., Rx antennas 816.

In some demonstrative aspects, utilizing the MIMO technique of transmission of the orthogonal signals from the Tx arrays 824 with N elements and processing the received signals in the Rx arrays 826 with M elements may be equivalent, e.g., under a far field approximation, to a radar utilizing transmission from one antenna and reception with N*M antennas. For example, radar frontend 804 and/or radar processor 834 may be configured to utilize MIMO antenna array 881 as a virtual array having an equivalent array size of N*M, which may define locations of virtual elements, for example, as a convolution of locations of physical elements, e.g., the antennas 814 and/or 816.

In some demonstrative aspects, a radar system may include a plurality of radar devices 800. For example, vehicle 100 (FIG. 1) may include a plurality of radar devices 800, e.g., as described below.

Figure 9:
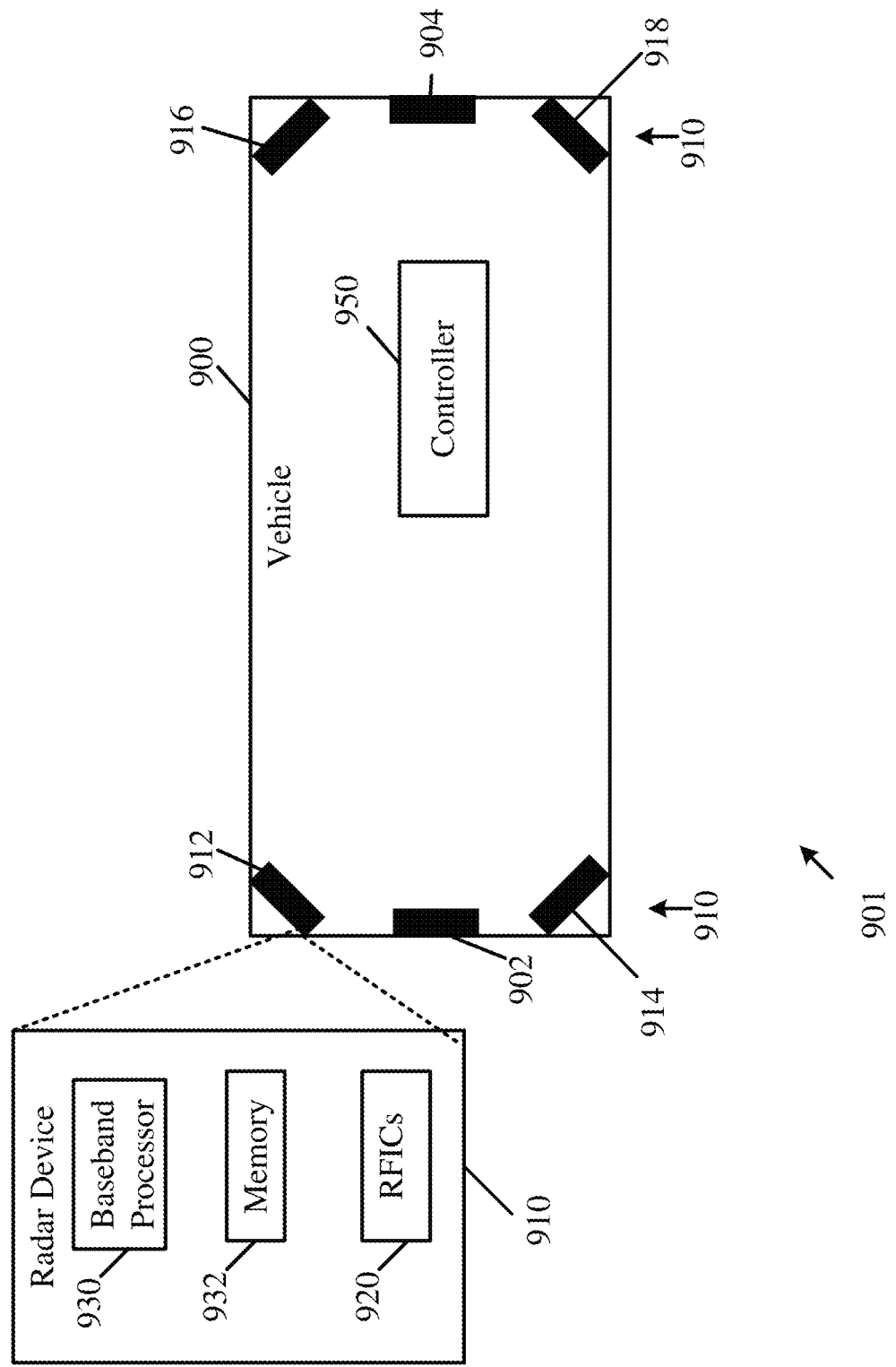
FIG. 9 is a schematic illustration of a radar system including a plurality of radar devices implemented in a vehicle, in accordance with some demonstrative aspects.

Reference is made to FIG. 9, which schematically illustrates a radar system 901 including a plurality of radar devices 910 implemented in a vehicle 900, in accordance with some demonstrative aspects.

In some demonstrative aspects, as shown in FIG. 9, the plurality of radar devices 910 may be located, for example, at a plurality of positions around vehicle 900, for example, to provide radar sensing at a large field of view around vehicle 900, e.g., as described below.

In some demonstrative aspects, as shown in FIG. 9, the plurality of radar devices 910 may include, for example, six radar devices 910, e.g., as described below.

In some demonstrative aspects, the plurality of radar devices 910 may be located, for example, at a plurality of positions around vehicle 900, which may be configured to support 360-degrees radar sensing, e.g., a field of view of 360 degrees surrounding the vehicle 900, e.g., as described below.

In one example, the 360-degrees radar sensing may allow to provide a radar-based view of substantially all surroundings around vehicle 900, e.g., as described below.

In other aspects, the plurality of radar devices 910 may include any other number of radar devices 910, e.g., less than six radar devices or more than six radar devices.

In other aspects, the plurality of radar devices 910 may be positioned at any other locations and/or according to any other arrangement, which may support radar sensing at any other field of view around vehicle 900, e.g., 360-degrees radar sensing or radar sensing of any other field of view.

In some demonstrative aspects, as shown in FIG. 9, vehicle 900 may include a first radar device 902, e.g., a front radar device, at a front-side of vehicle 900.

In some demonstrative aspects, as shown in FIG. 9, vehicle 900 may include a second radar device 904, e.g., a back radar device, at a back-side of vehicle 900.

In some demonstrative aspects, as shown in FIG. 9, vehicle 900 may include one or more of radar devices at one or more respective corners of vehicle 900. For example, vehicle 900 may include a first corner radar device 912 at a first corner of vehicle 900, a second corner radar device 914 at a second corner of vehicle 900, a third corner radar device 916 at a third corner of vehicle 900, and/or a fourth corner radar device 918 at a fourth corner of vehicle 900.

In some demonstrative aspects, vehicle 900 may include one, some, or all, of the plurality of radar devices 910 shown in FIG. 9. For example, vehicle 900 may include the front radar device 902 and/or back radar device 904.

In other aspects, vehicle 900 may include any other additional or alternative radar devices, for example, at any other additional or alternative positions around vehicle 900. In one example, vehicle 900 may include a side radar, e.g., on a side of vehicle 900.

In some demonstrative aspects, as shown in FIG. 9, vehicle 900 may include a radar system controller 950 configured to control one or more, e.g., some or all, of the radar devices 910.

In some demonstrative aspects, at least part of the functionality of radar system controller 950 may be implemented by a dedicated controller, e.g., a dedicated system controller or central controller, which may be separate from the radar devices 910, and may be configured to control some or all of the radar devices 910.

In some demonstrative aspects, at least part of the functionality of radar system controller 950 may be implemented as part of at least one radar device 910.

In some demonstrative aspects, at least part of the functionality of radar system controller 950 may be implemented by a radar processor of at least one of the radar devices 910. For example, radar processor 834 (FIG. 8) may include one or more elements of radar system controller 950, and/or may perform one or more operations and/or functionalities of radar system controller 950.

In some demonstrative aspects, at least part of the functionality of radar system controller 950 may be implemented by a system controller of vehicle 900. For example, vehicle controller 108 (FIG. 1) may include one or more elements of radar system controller 950, and/or may perform one or more operations and/or functionalities of radar system controller 950.

In other aspects, one or more functionalities of system controller 950 may be implemented as part of any other element of vehicle 900.

In some demonstrative aspects, as shown in FIG. 9, a radar device 910 of the plurality of radar devices 910, e.g., each radar device 910, may include a baseband processor 930 (also referred to as a "Baseband Processing Unit (BPU)"), which may be configured to control communication of radar signals by the radar device 910, and/or to process radar signals communicated by the radar device 910. For example, baseband processor 930 may include one or more elements of radar processor 834 (FIG. 8), and/or may perform one or more operations and/or functionalities of radar processor 834 (FIG. 8).

In some demonstrative aspects, baseband processor 930 may include one or more components and/or elements configured for digital processing of radar signals communicated by the radar device 910, e.g., as described below.

In some demonstrative aspects, baseband processor 930 may include one or more FFT engines, matrix multiplication engines, DSP processors, and/or any other additional or alternative baseband, e.g., digital, processing components.

In some demonstrative aspects, as shown in FIG. 9, radar device 910 may include a memory 932, which may be configured to store data processed by, and/or to be processed by, baseband processor 910. For example, memory 932 may include one or more elements of memory 838 (FIG. 8), and/or may perform one or more operations and/or functionalities of memory 838 (FIG. 8).

In some demonstrative aspects, memory 932 may include an internal memory, and/or an interface to one or more external memories, e.g., an external Double Data Rate (DDR) memory, and/or any other type of memory.

In some demonstrative aspects, as shown in FIG. 9, radar device 910 may include one or more RF units, e.g., in the form of one or more RF Integrated Chips (RFICs) 920, which may be configured to communicate radar signals, e.g., as described below.

For example, an RFIC 920 may include one or more elements of front-end 804 (FIG. 8), and/or may perform one or more operations and/or functionalities of front-end 804 (FIG. 8).

In some demonstrative aspects, the plurality of RFICs 920 may be operable to form a radar antenna array including one or more Tx antenna arrays and one or more Rx antenna arrays.

For example, the plurality of RFICs 920 may be operable to form MIMO radar antenna 881 (FIG. 8) including Tx arrays 824 (FIG. 8), and/or Rx arrays 826 (FIG. 8).

In some demonstrative aspects, a radar device, e.g., radar device 910, may be implemented in one or more devices and/or systems, for example, a vehicle, to provide a technical solution for robust, accurate, and/or efficient detection of objects, e.g., as described below.

For example, a radar device, e.g., radar device 910, may be less prone to weather effects. Accordingly, the radar device may provide an important, or even critical, component for detecting objects in some use cases and/or scenarios, e.g., in bad weather conditions.

For example, a radar device may be implemented to provide a technical solution for object detection with an increasing level of resolution and/or an increasing level of accuracy, for example, as radar technology progresses. As a result, reliance on the radar device in safety-related decisions may increase more and more.

In some demonstrative aspects, a radar device, e.g., radar device 910, may be configured as a high resolution radar device (also referred to as an "imaging radar"), which may be configured to detect and/or track object with a high level of resolution, for example, compared to a resolution of a "classic" radar, which may be designed to detect and track aircrafts, and may not require a high resolution.

In some demonstrative aspects, a radar device, e.g., radar device 910, may be configured to track objects in part of, or the entirety of, the whole surroundings of device or system implementing the radar device, e.g., an autonomous car environment, or any other environment.

In some demonstrative aspects, a radar device, e.g., radar device 910, may be configured to detect and track moving objects, e.g., vehicles, pedestrians, animals, and/or the like, in part of, or the entirety of, the whole surroundings of device or system implementing the radar device.

In some demonstrative aspects, a radar device, e.g., radar device 910, may be configured to detect and track stationary objects, in part of, or the entirety of, the whole surroundings of device or system implementing the radar device. In one example, the stationary objects may include native static objects, for example, road elements, e.g., signs, bridges, side curbs, rails, fences, buildings, and/or the like. In another example, the stationary objects may include standing-still mobile/movable objects, for example, standing-still vehicles, e.g., parked cars and/or other parked vehicles, standing-still pedestrians, standing-still animals, or the like.

In some demonstrative aspects, a radar device, e.g., radar device 800 (FIG. 8) and/or radar device 910 (FIG. 9), may be configured to track multiple targets according to a Multi-Target Tracking (MTT) mechanism, e.g., as described below.

In some demonstrative aspects, the multi target tracking mechanism may be configured to provide a technical solution for detecting and tracking a large number of targets, e.g., stationary objects and/or moving objects, e.g., as described below.

In some demonstrative aspects, the multi target tracking mechanism may be configured to provide a technical solution for detecting and tracking a large number of targets, for example, even in scenarios where observations of targets may not be simply mapped per target, e.g., as described below.

In one example, in some use cases, scenarios and/or environments, it may be hard to determine whether a detection belongs to a specific target or to another target.

In another example, in some use cases, scenarios and/or environments, not all targets may be detected, and/or some detections may actually be false detections, e.g., detections that did not originate from any target.

In some demonstrative aspects, the multi target tracking mechanism may be configured based on a Probability Hypothesis Density (PHD) Filter, e.g., as described below.

In some demonstrative aspects, the PHD filter may be implemented, for example, using a Gaussian Mixture PHD (GMPHD), e.g., as described below.

In other aspects, the multi target tracking mechanism may be configured based on any other type of PHD filter, any other filter, and/or any other MTT method and/or algorithm.

In some demonstrative aspects, there may be one or more disadvantages, inefficiencies, and/or technical problems, for example, when implementing a PHD, for example, while assuming a common density function for all targets, e.g., as described below.

For example, a GMPHD implementation assuming a common density function for all targets may result in a fixed length of multivariate normal distribution. For example, this fixed length of multivariate normal distribution may result, for example, in tracking a density of target position and target velocity.

For example, this GMPHD implementation assuming a common density function for all targets may provide inaccurate results. In one example, as stationary objects do not have velocity, their estimated velocity may be expected to converge to zero. However, due to a nature of a Hypothesis Correlation Tracker, moving target hypotheses corresponding to stationary objects may have some probability. Accordingly, in case that a radar sensor does not provide a complete observation of a target velocity, the stationary objects may be observed as objects that have some velocity, e.g., when in fact they do not have any velocity.

In one example, For example, Doppler measurements of a target, e.g., a pedestrian, crossing a road may not be observed by a radar device, for example, as there may not be a radial component to a target velocity of the pedestrian, e.g., relative to the radar. As a result, a radar device implementing the GMPHD assuming a common density function for all targets may observe the target crossing the road as a static object, for example, although it should be expected that the pedestrian is to be identified as a moving target.

In another example, a radar device may not detect Doppler measurements from a static object. However, a radar device implementing the GMPHD assuming a common density function for all targets may wrongly detect stationary objects as crossing targets. For example, if the radar device receives many detections that fit a hypothesis of crossing targets, this hypothesis may remain, e.g., although the detections may actually be from static objects.

In some demonstrative aspects, a probability of erroneously treating a hypothesis of a moving target as a valid hypothesis may increase, for example, in an environment of a vehicle with many stationary objects, and/or many detection returns.

In one example, it may be hard to differentiate between a crossing pedestrian and a fence, which was not detected in some of the frames.

For example, a number of erroneous hypotheses erroneously assuming moving targets, which may remain as valid hypotheses, for example, as a number of detections in an environment increases.

For example, many ghost moving targets may take a long time to converge to stationary targets. Accordingly, a GMPHD implementation assuming a common density function for all targets may provide an inaccurate tracked image, e.g., which may assume many moving targets instead of stationary targets.

In some demonstrative aspects, there may be a need to provide a technical solution to support efficient implementation of an MTT mechanism, for example, in terms of computational complexity.

For example, implementation of an MTT mechanism assuming a common density function for all targets may have a relatively high computational complexity. For example, an implementation of an MTT mechanism may have a relatively high computational intensity, for example, if the MTT mechanism is required to track a probability hypothesis density of stationary objects and dynamic objects using both position dimensions (x,y,z) and velocity dimensions (Vx,Vy,Vz) for each of the statuary objects and dynamic objects In one example, a significant amount of computational power and/or memory may be "wasted" over the stationary objects, e.g., when using the velocity dimensions for the statuary objects, for example, in cases where most of the surrounding environment of the radar device includes a large amount of stationary objects.

In some demonstrative aspects, a radar device, e.g., radar device 800 (FIG. 8), and/or radar device 910, may implement an MTT mechanism, which may be configured to track a probability hypothesis density of moving objects using the position dimensions (x,y,z) and the velocity dimensions (Vx,Vy,Vz), and to track a probability hypothesis density of stationary objects using the position dimensions (x,y,z) for the stationary objects, e.g., while excluding the velocity dimensions for the stationary objects, e.g., as described below.

In some demonstrative aspects, a radar device, e.g., radar device 910, may include a radar tracker configured track to a plurality of targets in an environment of the radar device based on classification of the targets according to a plurality of target types, e.g., as described below.

In some demonstrative aspects, the radar tracker may be configured to implement an MTT mechanism based on a Composite-Hypothesis Correlation (CHC) mechanism configured for the plurality of target types, e.g., as described below.

In some demonstrative aspects, the radar tracker may be configured to implement an MTT mechanism based on a PHD filter mechanism configured for the plurality of target types, e.g., as described below.

In some demonstrative aspects, the radar tracker may be configured to implement an MTT mechanism based on a GMPHD filter configured for the plurality of target types, e.g., as described below.

In other aspects, the radar tracker may be configured to implement any other MTT mechanism configured for configured for the plurality of target types.

In some demonstrative aspects, the radar tracker may be configured to implement an MTT mechanism utilizing a plurality of density functions corresponding to the plurality of target types, e.g., as described below. For example, the MTT mechanism may be configured to utilize a different density function for each type of target, e.g., as described below.

In some demonstrative aspects, the plurality of target types may include two target types, e.g., as described below.

In other aspects, the plurality of target types may include any other count of target types.

In some demonstrative aspects, the plurality of target types may include a static target type and a dynamic target type, e.g., as described below.

In other aspects, the plurality of target types may include any other additional or alternative target types.

In some demonstrative aspects, the radar tracker may be configured to implement an MTT mechanism utilizing a first density function, e.g., configured for dynamic targets, and a second density function, e.g., configured for static targets, e.g., as described below.

In some demonstrative aspects, the first density function may be based on a first count of variables, e.g., configured to track dynamic targets, e.g., as described below.

In some demonstrative aspects, the second density function may be based on a second count of variables, e.g., configured to track stationary targets, e.g., as described below.

In some demonstrative aspects, the first count of variables to track the dynamic targets may be greater than the second count of variables to track the stationary targets, e.g., as described below.

In some demonstrative aspects, the first density function may be based on a plurality of position variables and a plurality of velocity variables, e.g., configured to track dynamic targets, e.g., as described below.

In some demonstrative aspects, the first density function may be based on a plurality of position variables, e.g., configured to track stationary targets, e.g., as described below.

In some demonstrative aspects, the density function for the dynamic targets may be based on six variables, e.g., including 3D position variables and 3D velocity variables.

For example, he density function for the dynamic targets may be based on three position dimensions (x,y,z), and three velocity dimensions (Vx,Vy,Vz).

In other aspects, the density function for the dynamic targets may be based on any other count of variables corresponding to the position and velocity of a target, e.g., in any other number of dimensions.

In some demonstrative aspects, the density function for the stationary targets may be based on three variables, e.g., including 3D position variables. For example, the density function for the stationary targets may be based on three position dimensions (x,y,z).

In other aspects, the density function for the stationary targets may be based on any other count of variables corresponding to the position of a target, e.g., in any other number of dimensions.

In some demonstrative aspects, the radar tracker may be configured to output an output image including a type indication for a target, e.g., a type indication per each target which may indicate a type of the target from the plurality of target types, e.g., as described below.

In some demonstrative aspects, the type indication for a target may include a dynamic target type or a stationary target type.

In other aspects, the type indication may include any other additional or alternative indication.

In some demonstrative aspects, the output image may include the type indication, e.g., per target, for example, in addition to, or instead of, an indication on whether or not the target has a radial speed.

In some demonstrative aspects, the output image including the type indication may be implemented to provide a technical solution, which may be informative and/or useful, for example, for higher layers, which may process the information regarding the tracked targets, e.g., as described below.

In some demonstrative aspects, the output image including the type indication may be implemented to provide a technical solution to improve tracking performance, to improve accuracy, and/or to improve resolution of a resulted output.

Figure 10:
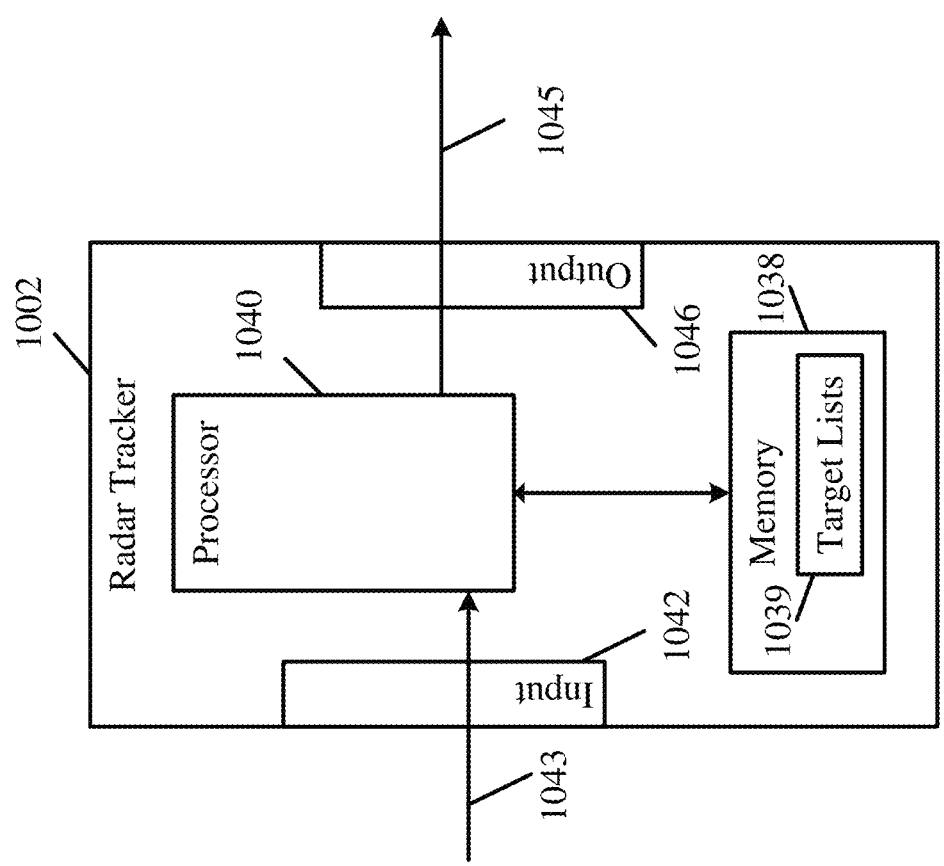
FIG. 10 is a schematic illustration of a radar tracker, in accordance with some demonstrative aspects.

Reference is made to FIG. 10, which schematically illustrates a radar tracker 1002, in accordance with some demonstrative aspects.

In some demonstrative aspects, radar tracker 1002 may be implemented, for example, as part of a radar device, e.g., radar device 910 (FIG. 9), and/or radar device 800 (FIG. 8).

In some demonstrative aspects, radar tracker 1002 may be implemented, for example, as part of a controller, e.g., controller 950 (FIG. 9).

In some demonstrative aspects, radar tracker 1002 may be implemented, for example, as part of a radar processor, e.g., radar processor 836 (FIG. 8), and/or BB processor 930 (FIG. 9).

In some demonstrative aspects, radar tracker 1002 may be configured to generate target tracking information 1045 corresponding to a plurality of targets in an environment of a radar device, for example, a radar device including radar tracker 1002, for example, radar device 910 (FIG. 9), and/or radar device 800 (FIG. 8), e.g., as described below.

In some demonstrative aspects, radar tracker 1002 may include a processor 1040 configured to determine the target tracking information 1045. For example, radar processor 834 (FIG. 8) may include one or more elements of processor 1040, and/or may perform one or more operations and/or functionalities of processor 1040; BB processor 930 (FIG. 9) may include one or more elements of processor 1040, and/or may perform one or more operations and/or functionalities of processor 1040; and/or controller 950 (FIG. 9) may include one or more elements of processor 1040, and/or may perform one or more operations and/or functionalities of processor 1040.

In other aspects, processor 1040 may be implemented as part of any other, dedicated, or non-dedicated, element of a radar device, e.g., radar device 800 (FIG. 8) or radar device 910 (FIG. 9), and/or of a radar system, e.g., radar system 901 (FIG. 9).

In some demonstrative aspects, processor 1040 may include, or may be implemented, partially or entirely, by circuitry and/or logic, e.g., one or more processors including circuitry and/or logic, memory circuitry and/or logic. Additionally or alternatively, one or more functionalities of processor 1040 may be implemented by logic, which may be executed by a machine and/or one or more processors, e.g., as described below.

In some demonstrative aspects, processor 1040 may be configured to determine the target tracking information 1045, for example, based on a plurality of multi-target density functions corresponding to a respective plurality of target types, e.g., as described below.

In some demonstrative aspects, the plurality of multi-target density functions may include a plurality of PHD Filters, e.g., as described below.

In some demonstrative aspects, the plurality of multi-target density functions may include a plurality of GMPHD Filters, e.g., as described below.

In other aspects, the plurality of multi-target density functions may include any other filters, and/or may be implemented by any other type of mechanism and/or algorithm.

In some demonstrative aspects, processor 1040 may be configured to update the plurality of multi-target density functions, for example, based on detection information 1043 corresponding to a plurality of detections in the environment of the radar device, e.g., as described below.

In some demonstrative aspects, processor 1040 may be configured to determine the target tracking information 1045, for example, based on a combination of the plurality of multi-target density functions, e.g., as described below.

In some demonstrative aspects, radar tracker 1002 may include an output 1046 to output the target tracking information 1045, e.g., as described below.

In some demonstrative aspects, radar tracker 1002 may provide the target tracking information 1045, for example, to a radar processor, e.g., a processor of radar processor 836 (FIG. 8), for example, via output 1046.

In some demonstrative aspects, radar tracker 1002 may provide the target tracking information 1045, for example, to a system controller, e.g., controller 950 (FIG. 9), for example, via output 1046.

In some demonstrative aspects, radar tracker 1002 may provide the target tracking information 1045, for example, to any other component and/or element of a radar device, e.g., radar device 910 (FIG. 9) and/or radar device 800 (FIG. 8), and/or a radar system, e.g., radar system 901 (FIG. 9).

In some demonstrative aspects, a radar device, e.g., radar device 800 (FIG. 8), may be configured to generate radar information, e.g., radar information 813 (FIG. 8), for example, based on the target tracking information 1045.

In some demonstrative aspects, radar tracker 1002 may include an input 1042 to receive the detection information 1043 corresponding to the plurality of detections in the environment of the radar device, e.g., as described below.

In some demonstrative aspects, the detection information 1043 may include radar detection information corresponding to a plurality of radar detections in the environment of the radar device, e.g., as described below.

In some demonstrative aspects, the detection information 1043 may include radar detection information corresponding to a plurality of radar detections and/or observations, which may be based on radar signals communicated by the radar device, e.g., as described below.

In some demonstrative aspects, the radar detection information may include information corresponding to potential radar targets, which may be detected based on radar signals communicated by the radar device, e.g., as described below.

In some demonstrative aspects, the detection information 1043 may include radar detection information of a plurality of potential radar targets, which may be detected based on radar signals communicated by the radar device, e.g., as described below.

In some demonstrative aspects, detection information 1043 may include processed radar data, which may be provided, for example, by another processor of the radar system.

In one example, detection information 1043 may be generated and/or provided by processor 836 (FIG. 8), for example, based on the radar Rx data 811 (FIG. 1).

In another example, detection information 1043 may be generated and/or provided by BB processor 930 (FIG. 9), for example, based on radar signals communicated by the radar device 910 (FIG. 9).

In other aspects, detection information 1043 may be generated and/or provided by any other element of a radar device and/or a radar system, e.g., radar device 800 (FIG. 8) and/or radar system 901 (FIG. 9).

In some demonstrative aspects, the detection information 1043 may be based on radar Rx data 811 (FIG. 8).

In one example, processor 836 (FIG. 8) may be configured to provide the detection information 1043 to radar tracker 1002.

In some demonstrative aspects, processor 1040 may be configured to classify a target of the plurality of targets as a target of the target type, for example, based on the detection information 1043, e.g., as described below.

In some demonstrative aspects, processor 1040 may be configured to determine a configuration of a multi-target density function corresponding to a target type, for example, based on one or more targets classified as targets of the target type, e.g., as described below.

In some demonstrative aspects, processor 1040 may be configured to reconfigure the multi-target density function corresponding to the target type, for example, based on a change in the one or more targets classified as targets of the target type, e.g., as described below.

In some demonstrative aspects, processor 1040 may be configured to reconfigure a first multi-target density function corresponding to a first target type and a second multi-target density function corresponding to a second target type, for example, based on a determination that a target classified as a target of the first target type is to be reclassified as a target of the second target type, e.g., as described below.

In some demonstrative aspects, processor 1040 may be configured to reconfigure the multi-target density function corresponding to the target type, for example, based on a determination that a new target is to be classified as a target of the target type, e.g., as described below.

In some demonstrative aspects, processor 1040 may be configured to make the determination that the new target is to be classified as the target of the target type, for example, based on the detection information 1043, e.g., as described below.

In some demonstrative aspects, processor 1040 may be configured to reconfigure a first multi-target density function corresponding to a first target type, for example, based on a new target of the first target type, e.g., as described below.

In some demonstrative aspects, the new target of the first target type may include a new target spawned from a target of a second target type according to a second multi-target density function corresponding to the second target type, e.g., as described below.

In some demonstrative aspects, radar tracker 1002 may include a memory 1038 configured to maintain information corresponding to the plurality of multi-target density functions, e.g., as described below.

In some demonstrative aspects, memory 1038 may be implemented, for example, as part of a memory of a radar processor. For example, memory 838 (FIG. 8) may include one or more elements of memory 1038, and/or may perform one or more operations and/or functionalities of memory 1038.

In some demonstrative aspects, memory 1038 may be implemented, for example, as part of any other, dedicated, or non-dedicated, element of a radar device, e.g., radar device 800 (FIG. 8) or radar device 910 (FIG. 9), and/or a radar system, e.g., radar system 901 (FIG. 9).

In some demonstrative aspects, processor 1040 may be configured to store in memory 1038 a plurality of target lists 1039 corresponding to the plurality of target types, e.g., as described below.

In some demonstrative aspects, a target list 1039 corresponding to a target type may include a plurality of targets classified as targets of the target type, e.g., as described below.

In some demonstrative aspects, processor 1040 may be configured to configure the plurality of multi-target density functions, for example, based on the plurality of target lists 1039, e.g., as described below.

In some demonstrative aspects, processor 1040 may be configured to dynamically update the plurality of target lists 1039, for example, based on the target tracking information 1045, e.g., as described below.

In some demonstrative aspects, processor 1040 may be configured to determine a plurality of predictions, for example, based on the plurality of multi-target density functions, e.g., as described below.

In some demonstrative aspects, processor 1040 may be configured to update the plurality of multi-target density functions, for example, based on the plurality of predictions and the plurality of detections 1043, e.g., as described below.

In some demonstrative aspects, the plurality of multi-target density functions may include at least a first multi-target density function corresponding to a first target type, and a second multi-target density function corresponding to a second target type, e.g., as described below.

In some demonstrative aspects, the first target type may be different from the second target type, e.g., as described below.

In some demonstrative aspects, the first multi-target density function may be different from the second multi-target density function, e.g., as described below.

In some demonstrative aspects, the first multi-target density function may be configured to track a first plurality of target dimensions, e.g., as described below.

In some demonstrative aspects, the second multi-target density function may be configured to track a second plurality of target dimensions, e.g., as described below.

In some demonstrative aspects, the first plurality of target dimensions may be different from the second plurality of target dimensions, e.g., as described below.

In some demonstrative aspects, the first plurality of target dimensions may include a first count of target dimensions, e.g., as described below.

In some demonstrative aspects, the second plurality of target dimensions may include a second count of target dimensions, e.g., as described below.

In some demonstrative aspects, the second count of target dimensions may be different from the first count of target dimensions, e.g., as described below.

In some demonstrative aspects, the first plurality of target dimensions may include 3 target dimensions, e.g., as described below.

In some demonstrative aspects, the second plurality of target dimensions may include 6 target dimensions, e.g., as described below.

In other aspects, the first plurality of target dimensions and/or the second plurality of target dimensions may include any other count of target dimensions.

In some demonstrative aspects, the first plurality of target dimensions may include a plurality of location-based target dimensions, e.g., as described below.

In some demonstrative aspects, the second plurality of target dimensions may include the plurality of location-based target dimensions and one or more velocity-based target dimensions, e.g., as described below.

In some demonstrative aspects, the one or more velocity-based target dimensions may be excluded from the first plurality of target dimensions, e.g., as described below.

In other aspects, the first plurality of target dimensions and/or the second plurality of target dimensions may include any other additional and/or alternative target dimensions.

In some demonstrative aspects, the plurality of target types may include a static target type, e.g., as described below.

In some demonstrative aspects, the plurality of target types may include a dynamic target type, e.g., as described below.

In other aspects, the plurality of target types may include any other additional and/or alternative target types.

In some demonstrative aspects, the plurality of multi-target density functions may include a first multi-target density function configured for static targets, and a second multi-target density function configured for dynamic targets, e.g., as described below.

In one example, processor 1040 may be configured to utilize a first multi-target density function configured for the static targets, for example, to track the location-based target dimensions, e.g., 3 location-based dimensions, of the static targets.

In one example, processor 1040 may be configured to utilize a second multi-target density function configured for the dynamic targets, for example, to track a plurality of location-based target dimensions and one or more velocity-based target dimensions of the dynamic targets. For example, the second multi-target density function may be configured for 4-6 dimensions, e.g., including 3 location-based target dimensions and 1-3 velocity-based target dimensions.

For example, processor 1040 may store in memory 1038 a static target list corresponding to the static targets and/or a dynamic target list corresponding to the dynamic targets.

For example, processor 1040 may configure the first multi-target density function configured for the static targets and/or the second multi-target density function configured for the dynamic targets, for example, based on the static target list and/or the dynamic target list, e.g., as described below.

In other aspects, the plurality of multi-target density functions may include any other additional and/or alternative types of multi-target density functions.

Figure 11:
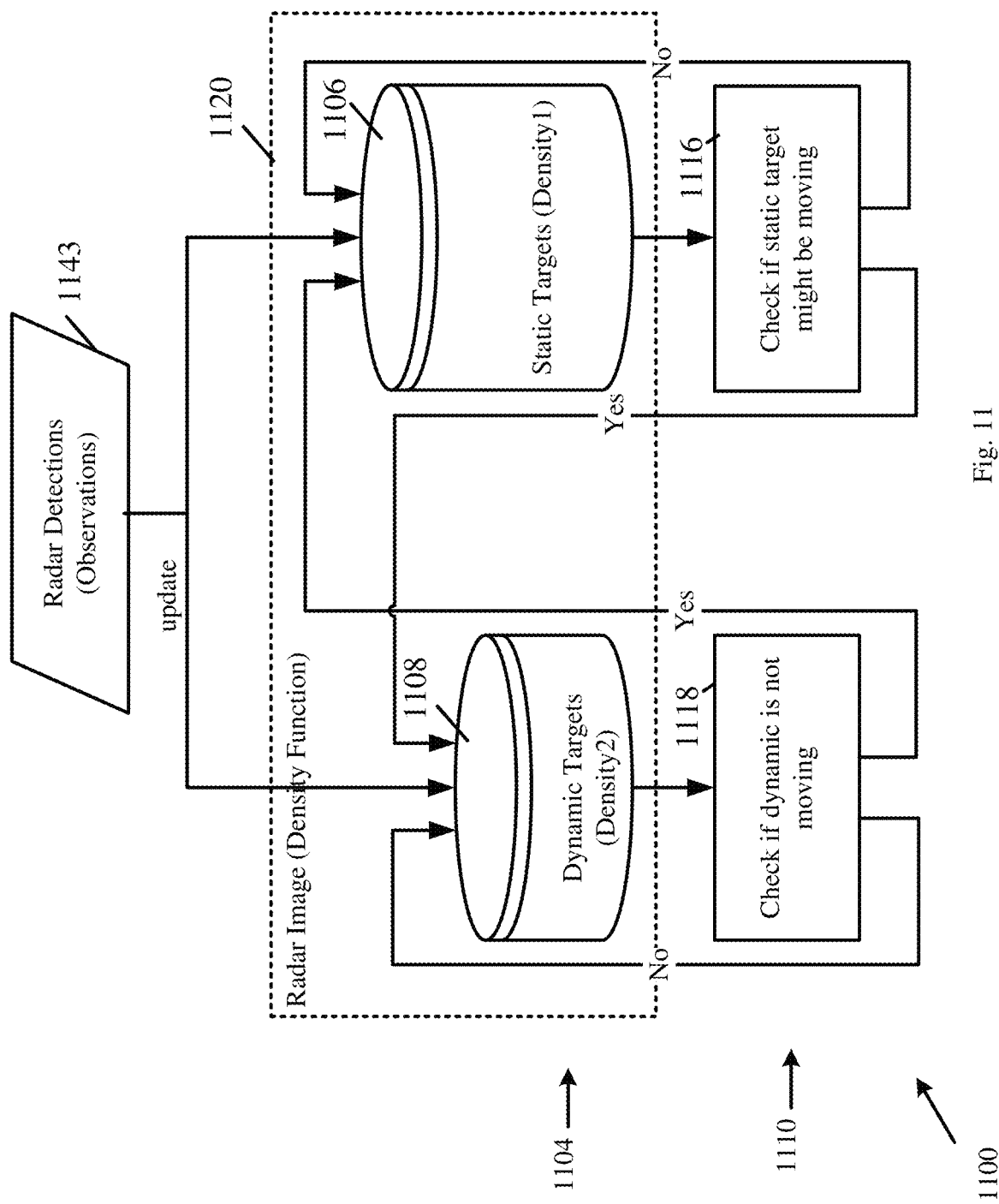
FIG. 11 is a schematic illustration of a radar tracking scheme, in accordance with some demonstrative aspects.

Reference is made to FIG. 11, which schematically illustrates a radar tracking scheme 1100 to track a plurality of targets in an environment of a radar device, in accordance with some demonstrative aspects.

In one example, a radar tracker, e.g., radar tracker 1002 (FIG. 10), and/or a processor, e.g., processor 1040 (FIG. 10), may perform one or more operations and/or functionalities of radar tracking scheme 1100, for example, to generate target tracking information 1045 (FIG. 10).

In some demonstrative aspects, as shown in FIG. 11, a radar tracker, e.g., radar tracker 1002 (FIG. 10), may maintain a plurality of target lists 1104 corresponding to a plurality of target types.

In some demonstrative aspects, a target list 1104 corresponding to a target type may include a plurality of targets classified as targets of the target type. In one example, each target list 1104 may include targets of a single type.

In some demonstrative aspects, as shown in FIG. 11, the plurality of target lists 1104 may include a first target list 1106 corresponding to targets classified as targets of a first target type, and a second target list 1108 corresponding to targets classified as targets of a second target type.

In some demonstrative aspects, as shown in FIG. 11, first target list 1106 may include a static target list 1106 corresponding to static targets, and second target list 1108 may include a dynamic target list 1108 corresponding to dynamic targets.

In some demonstrative aspects, a plurality of density functions may be configured with respect to the plurality of target types, e.g., as described below.

In some demonstrative aspects, a plurality of target type PHDs may be configured with respect to the plurality of target types, e.g., as described below.

For example, each target type PHD, may be defined according to a different density function.

In some demonstrative aspects, as shown in FIG. 11, a first density function may be configured for the static targets, for example, corresponding to the first target list 1106.

In some demonstrative aspects, as shown in FIG. 11, a second density function may be configured for the dynamic targets, for example, corresponding to the first target list 1108.

In one example, the density function configured for the dynamic targets based on the target list 1108 may be configured to track a plurality of location-based target dimensions and one or more velocity-based target dimensions, while the density function configured for the static targets based on the target list 1106 may be configured to track only the plurality of location-based target dimensions, for example, assuming and/or setting a zero velocity for all targets.

For example, the density function configured for the static targets based on the target list 1106 may be configured according to a first system model, and/or the density function configured for the dynamic targets based on the target list 1108 may be configured according to a second system model, which may be different from the first system model.

In some demonstrative aspects, the system model for a density function may define, for example, how the density function is allowed to change over time.

For example, the density function configured for the static targets based on the target list 1106 may be configured according to a first system model, which may set a constant value of zero to all velocity-based dimensions, and/or the density function configured for the dynamic targets based on the target list 1108 may be configured according to a second system model, which may allow the velocity-based target dimensions to change over time.

In some demonstrative aspects, e.g., radar tracker 1002 (FIG. 10), may be configured to classify a target of the plurality of targets as a target of the target type, for example, based on detection information 1143.

In some demonstrative aspects, as shown in FIG. 11, a radar tracker, e.g., radar tracker 1002 (FIG. 10), may be configured to update the first and second density functions and/or the target lists 1106 and/or 1108, for example, based on the detection information 1143.

In some demonstrative aspects, a radar tracker, e.g., radar tracker 1002 (FIG. 10), may be configured to configure the first and second density functions, for example, based on the plurality of target lists 1104.

In some demonstrative aspects, as shown in FIG. 11, radar tracking scheme 1100 may implement a mechanism 1110 to detect and correct a target type if needed, for example, when one or more targets are wrongly classified, e.g., as described below.

In some demonstrative aspects, as indicated at block 1116, a radar tracker, e.g., radar tracker 1002 (FIG. 10), may be configured to determine if a target of static target list 1106 is moving, for example, based on the detection information 1143.

In some demonstrative aspects, as indicated at block 1118, a radar tracker, e.g., radar tracker 1002 (FIG. 10), may be configured to determine if a target of dynamic target list 1108 is not moving, for example, based on the detection information 1143.

In some demonstrative aspects, as shown in FIG. 11, a radar tracker, e.g., radar tracker 1002 (FIG. 10), may be configured to reclassify one or more targets, for example, by moving the targets between the plurality of target lists 1104.

In some demonstrative aspects, target lists 1104 may include metadata corresponding to the targets in the target lists 1104. For example, the metadata for a target may include information configured to support a decision on moving the target between the plurality of target lists 1104.

For example, metadata for a dynamic target may include information to indicate an accumulated time that a velocity of the dynamic target is close to zero.

For example, metadata for a static target may include information to indicate a location where the static target was first created, for example, to verify that a position of the static target was not corrected many times.

In other aspects, the metadata for the targets may include any other additional and/or alternative information.

In some demonstrative aspects, as shown in FIG. 11, the detection information 1143 may be used to update a target density function 1120, e.g., including the density functions corresponding to the plurality of target lists 1104.

In some demonstrative aspects, an update of the target density function 1120 may consider candidate targets for transition between different target lists 1104.

In some demonstrative aspects, an update of the target density function 1120 may convert a target that meets a predefined criteria between the plurality of target lists 1104, and/or may configure the target density function 1120 accordingly.

In some demonstrative aspects, radar tracking scheme 1100 may be implemented by a PHD filter using a GMPHD filter. For example, radar tracking scheme 1100 may utilize a target density function using multi-variate normal probability density functions, e.g., a Gaussian.

For example, a Gaussian, e.g., each Gaussian, may be defined by a mean and a covariance matrix of the Gaussian.

In some demonstrative aspects, radar tracking scheme 1100 may be configured to utilize two types of Gaussians. For example, a 3-variable Gaussian may be configured for static targets, e.g., having a 3-element vector for the mean, and/or 3×3 matrix for the covariance matrix. For example, a 6-variable Gaussian may be configured for dynamic targets, e.g., having a 6-element vector for the mean, and/or a 6×6 matrix for the covariance matrix.

For example, the 6-variable dynamic Gaussians may require a larger memory size, e.g., a size which is more than double, compared to a memory size for the 3-variable static Gaussians, For example, the 6-variable dynamic Gaussians may require a higher computational effort, for example, compared to a computational effort for the 3-variable static Gaussians, e.g., for handling matrices.

In one example, implementing the 3-variable static Gaussians for static targets, e.g., instead of the 6-variable Gaussians, may provide a technical benefit of reduced computational effort, e.g., more than 50%, compared to the computational effort for the 6-variable Gaussians; and/or a technical benefit of reduced memory size, e.g., more than 50%, compared to the memory size for the 6-variable Gaussians.

In one example, a typical radar scene may include at least 75% static targets. Accordingly, an MTT mechanism using the 3-variable static Gaussians for static targets and the 6-variable dynamic Gaussians for dynamic targets may be implemented to provide technical benefits in terms of memory size and/or computational effort. For example, this MTT mechanism may achieve a reduction of up to about half of a memory footprint, and/or half of a computational requirement, e.g., compared to an implementation using a single type Gaussian, e.g., the 6-variables Gaussian, for both static and dynamic objects.

Figure 12:
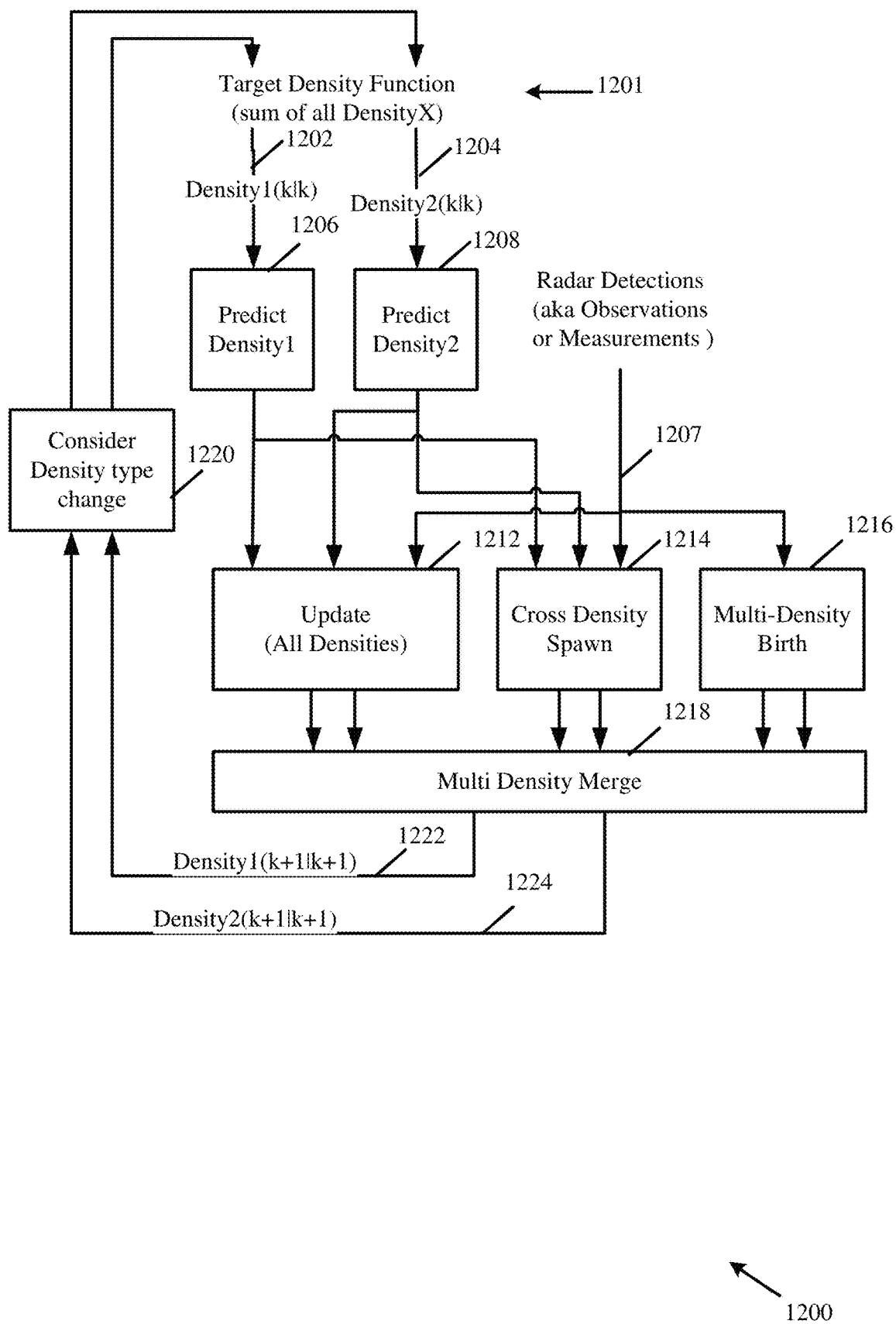
FIG. 12 is a schematic illustration of a radar tracking scheme, in accordance with some demonstrative aspects.

Reference is made to FIG. 12, which schematically illustrates a radar tracking scheme 1200 to track a plurality of targets in an environment of a radar device, in accordance with some demonstrative aspects.

In one example, a radar tracker, e.g., radar tracker 1002 (FIG. 10), and/or a processor, e.g., processor 1040 (FIG. 10), may be configured to perform one or more operations and/or functionalities of radar tracking scheme 1100, for example, to generate target tracking information 1045 (FIG. 10).

In some demonstrative aspects, as indicated by arrows 1201, radar tracking scheme 1200 may include processing a target density function, which is based on a combination of a first multi-target density function 1202 and a second multi-target density function 1204.

In some demonstrative aspects, first multi-target density function 1202 may correspond to a first target type, and/or second multi-target density function 1204 may correspond to a second target type.

In some demonstrative aspects, as indicated at block 1206, radar tracking scheme 1200 may include determining a first plurality of predictions, for example, based on the first multi-target density function 1202.

In some demonstrative aspects, as indicated at block 1208, radar tracking scheme 1200 may include determining a second plurality of predictions, for example, based on the second multi-target density function 1204.

In some demonstrative aspects, radar tracking scheme 1200 may include one or more operations to reconfigure the multi-target density function 1202 and/or multi-target density function 1204, for example, to generate updated multi-target density function 1222 and/or multi-target density function 1224, respectively.

In some demonstrative aspects, the multi-target density function 1202 and/or multi-target density function 1204 may be reconfigured, for example, based on the first and second pluralities of predictions, and a plurality of detections 1207, e.g., as described below.

In some demonstrative aspects, as indicated at block 1212, radar tracking scheme 1200 may include updating the multi-target density function 1202 and/or multi-target density function 1204, for example, based on the first and second pluralities of predictions and the plurality of detections 1207.

In some demonstrative aspects, as indicated at block 1216, radar tracking scheme 1200 may include updating the multi-target density function 1202 and/or multi-target density function 1204, for example, based on a determination that a new target is to be classified as a target of the first target type or the second target type.

In some demonstrative aspects, as indicated at block 1214, radar tracking scheme 1200 may include updating the multi-target density function 1202 and/or multi-target density function 1204, for example, based on a determination that a new target of the first target type is spawned from a target of the second target type, and/or based on a determination that a new target of the second target type is spawned from a target of the first target type.

In some demonstrative aspects, as indicated at block 1218, radar tracking scheme 1200 may include generating updated multi-target density function 1222 and/or updated multi-target density function 1224, for example, by merging updates of the multi-target density function 1202 and/or multi-target density function 1204, e.g., according to the update operation of block 1212, the cross-density spawn of block 1214, and/or the target birth of block 1216.

In some demonstrative aspects, as shown in FIG. 12, multi-target density function 1202 and/or multi-target density function 1204 may be used for processing detections of a current radar frame, denoted k, and updated multi-target density function 1212 and/or updated multi-target density function 1214 may be used for processing detections of a next radar frame, denoted k+1.

In some demonstrative aspects, as indicated at block 1220, radar tracking scheme 1200 may include selectively reconfiguring the updated multi-target density function 1212 and/or updated multi-target density function 1214, for example, based on a determination whether a target classified as a target of the first target type is to be reclassified as a target of the second target type, or vice versa.

Figure 13:
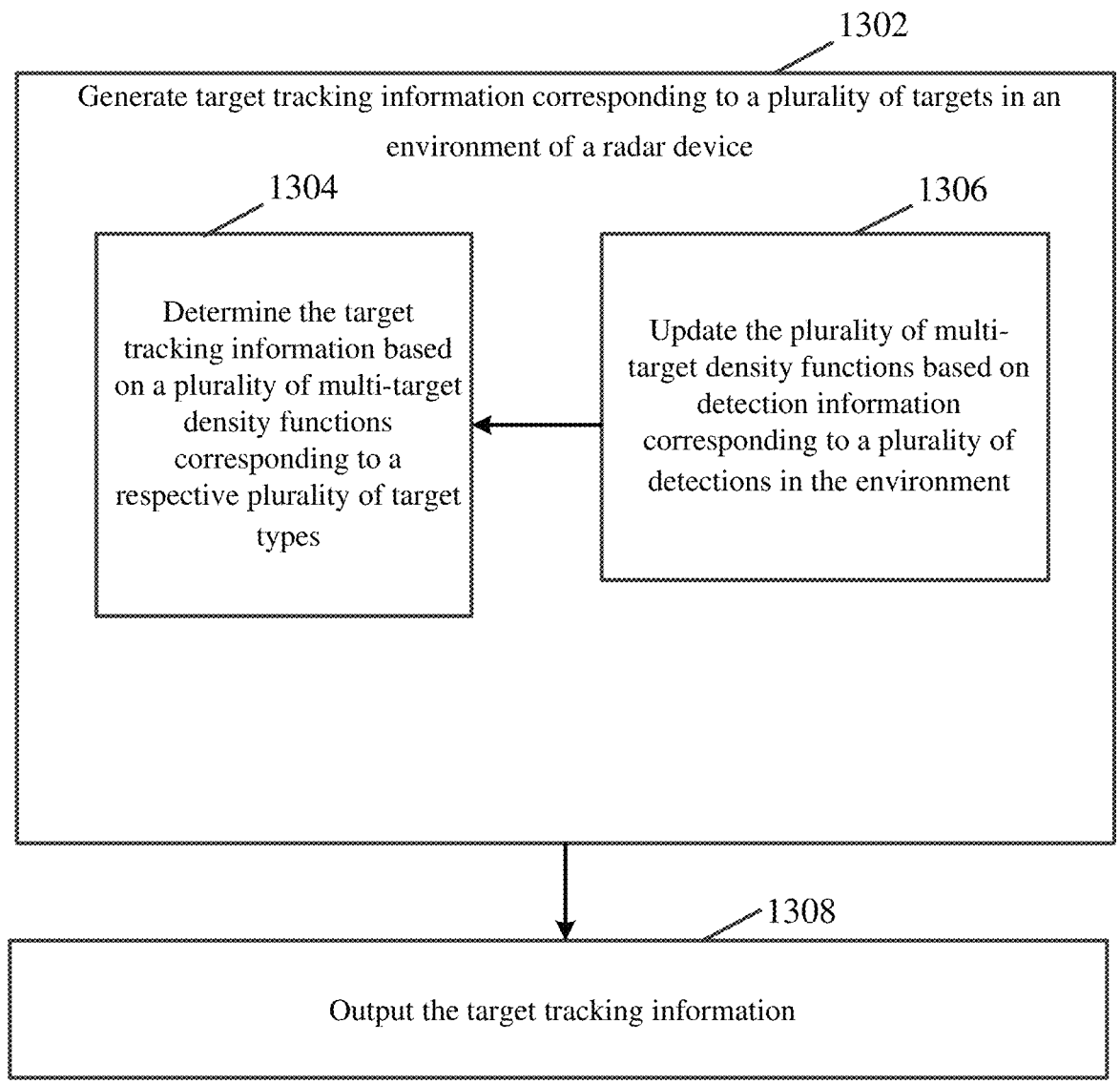
FIG. 13 is a schematic flow chart illustration of a method of generating target tracking information, in accordance with some demonstrative aspects.

Reference is made to FIG. 13, which schematically illustrates a method of generating target tracking information, in accordance with some demonstrative aspects. For example, one or more of the operations of the method of FIG. 13 may be performed by a radar system, e.g., radar system 900 (FIG. 9); a radar device, e.g., radar device 101 (FIG. 1), radar device 800 (FIG. 8), and/or radar device 910 (FIG. 9); a radar tracker, e.g., radar tracker 1002 (FIG. 10); a processor, e.g., processor 836 (FIG. 8), radar processor 834 (FIG. 8), processor 1040 (FIG. 10), and/or baseband processor 930 (FIG. 9); and/or a controller, e.g., controller 950 (FIG. 9).

As indicated at block 1302, the method may include generating target tracking information corresponding to a plurality of targets in an environment of a radar device. For example, processor 1040 (FIG. 10) may be configured to generate target tracking information 1045 (FIG. 10) corresponding to the plurality of targets in the environment of radar device 910 (FIG. 9), e.g., as described above.

As indicated at block 1304, generating the target tracking information may include determining the target tracking information based on a plurality of multi-target density functions corresponding to a respective plurality of target types. For example, processor 1040 (FIG. 10) may be configured to determine the target tracking information 1045 (FIG. 10) based on the plurality of multi-target density functions corresponding to the respective plurality of target types, e.g., as described above.

As indicated at block 1306, generating the target tracking information may include updating the plurality of multi-target density functions, for example, based on detection information corresponding to a plurality of detections in the environment. For example, processor 1040 (FIG. 10) may be configured to update the plurality of multi-target density functions based on the detection information 1043 (FIG. 10) corresponding to the plurality of detections in the environment, e.g., as described above.

As indicated at block 1308, the method may include outputting the target tracking information. For example, processor 1040 (FIG. 10) may be configured to output the target tracking information via output 1046 (FIG. 10), e.g., as described above.

Figure 14:
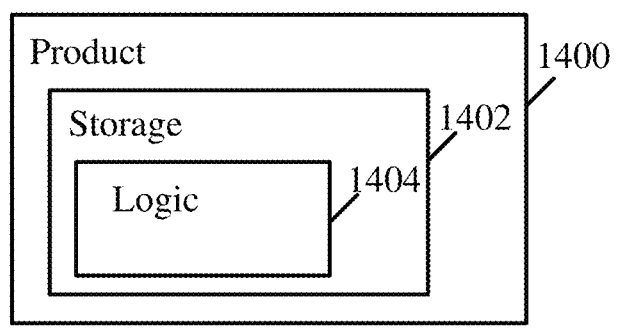
FIG. 14 is a schematic illustration of a product of manufacture, in accordance with some demonstrative aspects.

Reference is made to FIG. 14, which schematically illustrates a product of manufacture 1400, in accordance with some demonstrative aspects. Product 1400 may include one or more tangible computer-readable ("machine-readable") non-transitory storage media 1402, which may include computer-executable instructions, e.g., implemented by logic 1404, operable to, when executed by at least one computer processor, enable the at least one computer processor to implement one or more operations and/or functionalities described with reference to the FIGS. 1-13, and/or one or more operations described herein. The phrases "non-transitory machine-readable medium" and "computer-readable non-transitory storage media" may be directed to include all machine and/or computer readable media, with the sole exception being a transitory propagating signal.

In some demonstrative aspects, product 1400 and/or storage media 1402 may include one or more types of computer-readable storage media capable of storing data, including volatile memory, non-volatile memory, removable or non-removable memory, erasable or non-erasable memory, writeable or re-writeable memory, and the like. For example, storage media 1402 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative aspects, logic 1404 may include instructions, data, and/or code, which, if executed by a machine, may cause the machine to perform a method, process, and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative aspects, logic 1404 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner, or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

Examples

The following examples pertain to further aspects.

Example 1 includes an apparatus comprising a radar tracker configured to generate target tracking information corresponding to a plurality of targets in an environment of the apparatus, the radar tracker comprising a processor configured to determine the target tracking information based on a plurality of multi-target density functions corresponding to a respective plurality of target types, and to update the plurality of multi-target density functions based on detection information corresponding to a plurality of detections in the environment; and an output to output the target tracking information.

Example 2 includes the subject matter of Example 1, and optionally, wherein the processor is configured to determine a configuration of a multi-target density function corresponding to a target type based on one or more targets classified as targets of the target type.

Example 3 includes the subject matter of Example 2, and optionally, wherein the processor is configured to reconfigure the multi-target density function corresponding to the target type based on a change in the one or more targets classified as targets of the target type.

Example 4 includes the subject matter of Example 2 or 3, and optionally, wherein the processor is configured to reconfigure a first multi-target density function corresponding to a first target type and a second multi-target density function corresponding to a second target type based on a determination that a target classified as a target of the first target type is to be reclassified as a target of the second target type.

Example 5 includes the subject matter of any one of Examples 2-4, and optionally, wherein the processor is configured to reconfigure the multi-target density function corresponding to the target type based on a determination that a new target is to be classified as a target of the target type, wherein the determination that the new target is to be classified as the target of the target type is based on the detection information.

Example 6 includes the subject matter of any one of Examples 2-5, and optionally, wherein the processor is configured to reconfigure a first multi-target density function corresponding to a first target type based on a new target of the first target type, wherein the new target of the first target type is spawned from a target of a second target type according to a second multi-target density function corresponding to the second target type.

Example 7 includes the subject matter of any one of Examples 1-6, and optionally, wherein the processor is configured to classify a target of the plurality of targets as a target of the target type based on the detection information.

Example 8 includes the subject matter of any one of Examples 1-7, and optionally, wherein the plurality of multi-target density functions comprises at least a first multi-target density function corresponding to a first target type, and a second multi-target density function corresponding to a second target type, wherein the first target type is different from the second target type, the first multi-target density function is different from the second multi-target density function.

Example 9 includes the subject matter of Example 8, and optionally, wherein the first multi-target density function is configured to track a first plurality of target dimensions, and the second multi-target density function is configured to track a second plurality of target dimensions, wherein the first plurality of target dimensions is different from the second plurality of target dimensions.

Example 10 includes the subject matter of Example 9, and optionally, wherein the first plurality of target dimensions comprises a first count of target dimensions, the second plurality of target dimensions comprises a second count of target dimensions, the second count of target dimensions is different from the first count of target dimensions.

Example 11 includes the subject matter of Example 9 or 10, and optionally, wherein the first plurality of target dimensions comprises a plurality of location-based target dimensions, and wherein the second plurality of target dimensions comprises the plurality of location-based target dimensions and one or more velocity-based target dimensions, wherein the one or more velocity-based target dimensions are excluded from the first plurality of target dimensions.

Example 12 includes the subject matter of any one of Examples 9-11, and optionally, wherein the first plurality of target dimensions comprises 3 target dimensions, and wherein the second plurality of target dimensions comprises 6 target dimensions.

Example 13 includes the subject matter of any one of Examples 1-12, and optionally, wherein the processor is configured to store in a memory a plurality of target lists corresponding to the plurality of target types, and to configure the plurality of multi-target density functions based on the plurality of target lists, wherein a target list corresponding to a target type comprises a plurality of targets classified as targets of the target type.

Example 14 includes the subject matter of Example 13, and optionally, wherein the processor is configured to update the plurality of target lists based on the target tracking information.

Example 15 includes the subject matter of any one of Examples 1-14, and optionally, wherein the plurality of target types comprises a static target type and a dynamic target type, wherein the plurality of multi-target density functions comprises a first multi-target density function configured for static targets, and a second multi-target density function configured for dynamic targets.

Example 16 includes the subject matter of any one of Examples 1-15, and optionally, wherein the processor is configured to determine a plurality of predictions based on the plurality of multi-target density functions, and to update the plurality of multi-target density functions based on the plurality of predictions and the plurality of detections.

Example 17 includes the subject matter of any one of Examples 1-16, and optionally, wherein the processor is configured to determine the target tracking information based on a combination of the plurality of multi-target density functions.

Example 18 includes the subject matter of any one of Examples 1-17, and optionally, wherein the plurality of multi-target density functions comprises a plurality of Probability Hypothesis Density (PHD) Filters.

Example 19 includes the subject matter of Example 18, and optionally, wherein the plurality of multi-target density functions comprises a plurality of Gaussian Mixture Probability Hypothesis Density (GMPHD) Filters.

Example 20 includes the subject matter of any one of Examples 1-19, and optionally, wherein the detection information comprises radar detection information corresponding to a plurality of radar detections in the environment, the plurality of radar detections based on radar signals communicated by a radar device.

Example 21 includes the subject matter of any one of Examples 1-20, and optionally, comprising an input to receive the detection information corresponding to the plurality of detections in the environment.

Example 22 includes the subject matter of any one of Examples 1-21, and optionally, comprising a radar device, the radar device configured to generate radar information based on the target tracking information.

Example 23 includes the subject matter of Example 22, and optionally, comprising a vehicle, the vehicle comprising a system controller to control one or more systems of the vehicle based on the radar information.

Example 24 includes an apparatus comprising means for executing any of the described operations of one or more of Examples 1-23.

Example 25 includes a machine-readable medium that stores instructions for execution by a processor to perform any of the described operations of one or more of Examples 1-23.

Example 26 includes a product comprising one or more tangible computer-readable non-transitory storage media comprising computer-executable instructions operable to, when executed by at least one processor, enable the at least one processor to cause a computing device to perform any of the described operations of any one of Examples 1-23.

Example 27 includes an apparatus comprising a memory; and processing circuitry configured to perform any of the described operations of one or more of Examples 1-23.

Example 28 includes a method including any of the described operations of one or more of Examples 1-23.

Functions, operations, components and/or features described herein with reference to one or more aspects, may be combined with, or may be utilized in combination with, one or more other functions, operations, components and/or features described herein with reference to one or more other aspects, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

The invention claimed is:

1. An apparatus comprising:
a radar tracker configured to generate target tracking information corresponding to a plurality of targets in an environment of the apparatus, the radar tracker comprising:
a processor configured to determine the target tracking information based on a plurality of multi-target density functions corresponding to a respective plurality of target types, and to update the plurality of multi-target density functions based on detection information corresponding to a plurality of detections in the environment, wherein the plurality of multi-target density functions comprises at least a first multi-target density function corresponding to a first target type, and a second multi-target density function corresponding to a second target type, wherein the first target type is different from the second target type, the first multi-target density function is different from the second multi-target density function, wherein the first multi-target density function is configured to track a first plurality of target dimensions, and the second multi-target density function is configured to track a second plurality of target dimensions, the first plurality of target dimensions is different from the second plurality of target dimensions; and
an output to output the target tracking information.

2. The apparatus of claim 1, wherein the processor is configured to determine a configuration of the first multi-target density function corresponding to the first target type based on one or more targets classified as targets of the first target type.

3. The apparatus of claim 2, wherein the processor is configured to reconfigure the first multi-target density function corresponding to the first target type based on a change in the one or more targets classified as targets of the first target type.

4. The apparatus of claim 2, wherein the processor is configured to reconfigure the first multi-target density function corresponding to the first target type and the second multi-target density function corresponding to the second target type based on a determination that a target classified as a target of the first target type is to be reclassified as a target of the second target type.

5. The apparatus of claim 2, wherein the processor is configured to reconfigure the first multi-target density function corresponding to the first target type based on a determination that a new target is to be classified as a target of the first target type, wherein the determination that the new target is to be classified as the target of the first target type is based on the detection information.

6. The apparatus of claim 2, wherein the processor is configured to reconfigure the first multi-target density function corresponding to the first target type based on a new target of the first target type, wherein the new target of the first target type is spawned from a target of the second target type according to the second multi-target density function corresponding to the second target type.

7. The apparatus of claim 1, wherein the processor is configured to classify a target of the plurality of targets as a target of the first target type based on the detection information.

8. The apparatus of claim 1, wherein the first plurality of target dimensions comprises a first count of target dimensions, the second plurality of target dimensions comprises a second count of target dimensions, the second count of target dimensions is different from the first count of target dimensions.

9. The apparatus of claim 1, wherein the first plurality of target dimensions comprises a plurality of location-based target dimensions, and wherein the second plurality of target dimensions comprises the plurality of location-based target dimensions and one or more velocity-based target dimensions, wherein the one or more velocity-based target dimensions are excluded from the first plurality of target dimensions.

10. The apparatus of claim 1, wherein the first plurality of target dimensions comprises 3 target dimensions, and wherein the second plurality of target dimensions comprises 6 target dimensions.

11. The apparatus of claim 1, wherein the processor is configured to store in a memory a plurality of target lists corresponding to the plurality of target types, and to configure the plurality of multi-target density functions based on the plurality of target lists, wherein a target list corresponding to the first target type comprises a plurality of targets classified as targets of the first target type.

12. The apparatus of claim 11, wherein the processor is configured to update the plurality of target lists based on the target tracking information.

13. The apparatus of claim 1, wherein the first target type comprises a static target type and the second target type comprises a dynamic target type, wherein the first multi-target density function is configured for static targets, and a the second multi-target density function is configured for dynamic targets.

14. The apparatus of claim 1, wherein the processor is configured to determine a plurality of predictions based on the plurality of multi-target density functions, and to update the plurality of multi-target density functions based on the plurality of predictions and the plurality of detections.

15. The apparatus of claim 1, wherein the processor is configured to determine the target tracking information based on a combination of the plurality of multi-target density functions.

16. The apparatus of claim 1, wherein the detection information comprises radar detection information corresponding to a plurality of radar detections in the environment, the plurality of radar detections based on radar signals communicated by a radar device.

17. The apparatus of claim 1, wherein the plurality of multi-target density functions comprises a plurality of Probability Hypothesis Density (PHD) Filters.

18. The apparatus of claim 1 comprising a radar device, the radar device configured to generate radar information based on the target tracking information.

19. A product comprising one or more tangible computer-readable non-transitory storage media comprising computer-executable instructions operable to, when executed by at least one processor, enable the at least one processor to:
determine target tracking information corresponding to a plurality of targets in an environment of a radar device based on a plurality of multi-target density functions corresponding to a respective plurality of target types, wherein the plurality of multi-target density functions comprises at least a first multi-target density function corresponding to a first target type, and a second multi-target density function corresponding to a second target type, wherein the first target type is different from the second target type, the first multi-target density function is different from the second multi-target density function, wherein the first multi-target density function is configured to track a first plurality of target dimensions, and the second multi-target density function is configured to track a second plurality of target dimensions, the first plurality of target dimensions is different from the second plurality of target dimensions;
update the plurality of multi-target density functions based on detection information corresponding to a plurality of detections in the environment; and
output the target tracking information.

20. The product of claim 19, wherein the first target type comprises a static target type and the second target type comprises a dynamic target type, wherein the first multi-target density function is configured for static targets, and a the second multi-target density function is configured for dynamic targets.

21. The product of claim 19, wherein the instructions, when executed, cause the processor to store in a memory a plurality of target lists corresponding to the plurality of target types, and to configure the plurality of multi-target density functions based on the plurality of target lists, wherein a target list corresponding to the first target type comprises a plurality of targets classified as targets of the first target type.

22. A vehicle comprising:
a system controller configured to control one or more vehicular systems of the vehicle based on radar information; and
a radar device configured to provide the radar information based on target tracking information corresponding to a plurality of targets in an environment of the vehicle, the radar device comprising:
a plurality of Transmit (Tx) antennas to transmit radar Tx signals;
a plurality of Receive (Rx) antennas to receive radar Rx signals based on the radar Tx signals; and
a processor configured to determine the target tracking information based on a plurality of multi-target density functions corresponding to a respective plurality of target types, wherein the processor is configured to update the plurality of multi-target density functions based on detection information corresponding to a plurality of detections in the environment, wherein the detection information is based on the radar Rx signals, wherein the plurality of multi-target density functions comprises at least a first multi-target density function corresponding to a first target type, and a second multi-target density function corresponding to a second target type, wherein the first target type is different from the second target type, the first multi-target density function is different from the second multi-target density function, wherein the first multi-target density function is configured to track a first plurality of target dimensions, and the second multi-target density function is configured to track a second plurality of target dimensions, the first plurality of target dimensions is different from the second plurality of target dimensions.

23. The vehicle of claim 22, wherein the first plurality of target dimensions comprises a first count of target dimensions, the second plurality of target dimensions comprises a second count of target dimensions, the second count of target dimensions is different from the first count of target dimensions.

* * * * *